US011817981B1

(12) United States Patent
Yang et al.

(10) Patent No.: US 11,817,981 B1
(45) Date of Patent: Nov. 14, 2023

(54) 60 GHZ NUMEROLOGY FOR WIRELESS LOCAL AREA NETWORKS (WLANS)

(71) Applicant: QUALCOMM Incorporated, San Diego, CA (US)

(72) Inventors: Lin Yang, San Diego, CA (US); Bin Tian, San Diego, CA (US); Youhan Kim, Saratoga, CA (US); Jialing Li Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 17/727,634

(22) Filed: Apr. 22, 2022

(51) Int. Cl.
*H04L 27/26* (2006.01)
*H04L 5/00* (2006.01)
*H04W 84/12* (2009.01)
*H04W 4/00* (2018.01)

(52) U.S. Cl.
CPC .... *H04L 27/26025* (2021.01); *H04L 27/2607* (2013.01); *H04L 27/2628* (2013.01); *H04W 84/12* (2013.01)

(58) Field of Classification Search
CPC ........... H04L 27/2602; H04L 27/26025; H04L 27/2607; H04L 5/001; H04L 5/0064; H04L 5/0092; H04L 5/0094; H04L 69/323; H04W 16/06
See application file for complete search history.

(56) References Cited

U.S. PATENT DOCUMENTS 9,750,080 B2 * 8/2017 Park .................... H04L 27/2602
2023/0101410 A1 3/2023 Cheng et al.

FOREIGN PATENT DOCUMENTS

WO WO-2018226553 A1 12/2018
WO WO-2021183035 A1 9/2021

OTHER PUBLICATIONS

International Search Report and Written Opinion—PCT/US2023/016907—ISA/EPO—dated Jul. 3, 2023 (2201946WO).

* cited by examiner

*Primary Examiner* — Melvin C Marcelo
*Assistant Examiner* — Natali Pascual Peguero
(74) *Attorney, Agent, or Firm* — Holland & Hart / Qualcomm

(57) ABSTRACT

This disclosure provides methods, devices and systems for increasing carrier frequencies for wireless communications in wireless local area networks (WLANs). Some implementations more specifically relate to packet designs and numerologies that support wireless communications on carrier frequencies above 7 GHz. In some aspects, a wireless communication device may up-clock a physical layer (PHY) convergence protocol (PLCP) protocol data unit (PPDU) for transmission on carrier frequencies above 7 GHz, where the PPDU conforms to an existing PPDU format associated with carrier frequencies below 7 GHz. As used herein, the term "up-clocking" refers to increasing the frequency of a clock signal used to convert the PPDU between the frequency domain and the time domain. In some aspects, the up-clocking may result in a subcarrier spacing (SCS) greater than or equal to 1.2 MHz, where the SCS represents a spacing between the subcarriers on which a PHY preamble of the PPDU is modulated.

30 Claims, 34 Drawing Sheets

*Figure 12A*
1200
20 MHZ
L-STF
L-LTF
L-SIG
RL-SIG
SIG1
SIG2
STF
LTFs
Data
PE
1201
1202
1203
1204

60 GHZ NUMEROLOGY FOR WIRELESS LOCAL AREA NETWORKS (WLANS)

TECHNICAL FIELD

This disclosure relates generally to wireless communication, and more specifically, to a 60 GHz numerology for wireless local area networks (WLANs).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Many existing WLAN communication protocols are designed for wireless communications on carrier frequencies below 7 GHz (such as in the 2.4 GHz, 5 GHz, or 6 GHz frequency bands). However, new WLAN communication protocols are being developed to enable enhanced WLAN communication features (such as higher throughput and wider bandwidth) that require even higher carrier frequencies (such as in the 45 GHz or 60 GHz frequency bands). Wireless communications on higher carrier frequencies may suffer from greater phase noise and greater path loss compared to wireless communications on lower carrier frequencies. Thus, as new WLAN communication protocols enable enhanced features, new packet designs and numerology are needed to support wireless communications on carrier frequencies above 7 GHz.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include mapping, to a plurality of subcarriers, a physical layer (PHY) convergence protocol (PLCP) protocol data unit (PPDU) conforming to a PPDU format associated with wireless communications on a carrier frequency below 7 GHz, where the plurality of subcarriers spans a bandwidth (BW) associated with the PPDU format; transforming the plurality of subcarriers into a time-varying signal at a sampling rate ($f_s$) higher than BW; and transmitting the time-varying signal, over a wireless channel, on a carrier frequency above 7 GHz. In some implementations, $f_s$=4*BW. In some other implementations, $f_s$=8*BW. In some other implementations, $f_s$=16*BW. Still further, in some implementations, $f_s$=32*BW.

In some aspects, the PPDU may include a PHY preamble followed by a data portion and the sampling rate $f_s$ may be associated with a subcarrier spacing (SCS) greater than 1.2 MHz, where the SCS represents an amount of separation, in the frequency domain, between adjacent subcarriers of the plurality of subcarriers to which the PHY preamble is mapped. In some implementations, the SCS may be equal to 10 MHz. In some other implementations, the SCS may be equal to 7.5 MHz. In such implementations, the plurality of subcarriers includes 108 data subcarriers, 6 pilot subcarriers, 11 guard subcarriers, and 3 DC subcarriers, the plurality of subcarriers is transformed into the time-varying signal based on a 128-point IFFT, and $f_s$=960 MHz.

In some aspects, the SCS may be equal to 1.25 MHz. In some implementations, the plurality of subcarriers may include 234 data subcarriers, 8 pilot subcarriers, 11 guard subcarriers, and 3 direct current (DC) subcarriers, the plurality of subcarriers may be transformed into the time-varying signal based on a 256-point IFFT, and $f_s$=320 MHz. In some other implementations, the plurality of subcarriers may include 468 data subcarriers, 16 pilot subcarriers, 11 guard subcarriers, and 11 DC subcarriers, the plurality of subcarriers may be transformed into the time-varying signal based on two 256-point IFFTs, and $f_s$=640 MHz.

In some aspects, the SCS may be equal to 1.875 MHz. In some implementations, the plurality of subcarriers may include 234 data subcarriers, 8 pilot subcarriers, 11 guard subcarriers, and 3 DC subcarriers, the plurality of subcarriers may be transformed into the time-varying signal based on a 256-point IFFT, and $f_s$=480 MHz. In some other implementations, the plurality of subcarriers includes 468 data subcarriers, 16 pilot subcarriers, 11 guard subcarriers, and 11 DC subcarriers, the plurality of subcarriers may be transformed into the time-varying signal based on two 256-point IFFTs, and $f_s$=960 MHz.

In some aspects, the SCS may be equal to 2.5 MHz. In some implementations, the plurality of subcarriers may include 108 data subcarriers, 6 pilot subcarriers, 11 guard subcarriers, and 3 DC subcarriers, the plurality of subcarriers may be transformed into the time-varying signal based on a 128-point IFFT, and $f_s$=320 MHz. In some other implementations, the plurality of subcarriers may include 468 data subcarriers, 16 pilot subcarriers, 11 guard subcarriers, and 11 DC subcarriers, the plurality of subcarriers may be transformed into the time-varying signal based on a 512-point IFFT, and $f_s$=1.28 GHz. Still further, in some implementations, the plurality of subcarriers may include 468 data subcarriers, 16 pilot subcarriers, 23 guard subcarriers, and 5 DC subcarriers, the plurality of subcarriers may be transformed into the time-varying signal based on a 512-point IFFT, and $f_s$=1.28 GHz.

In some aspects, the SCS may be equal to 3.75 MHz. In some implementations, the plurality of subcarriers may include 108 data subcarriers, 6 pilot subcarriers, 11 guard subcarriers, and 3 DC subcarriers, the plurality of subcarriers may be transformed into the time-varying signal based on a 128-point IFFT, and $f_s$=480 MHz. In some other implementations, the plurality of subcarriers may include 468 data subcarriers, 16 pilot subcarriers, 11 guard subcarriers, and 11 DC subcarriers, the plurality of subcarriers may be transformed into the time-varying signal based on a 512-point IFFT, and $f_s$=1.92 GHz. Still further, in some implementations, the plurality of subcarriers may include 468 data subcarriers, 16 pilot subcarriers, 23 guard subcarriers, and 5 DC subcarriers, the plurality of subcarriers may be transformed into the time-varying signal based on a 512-point IFFT, and $f_s$=1.92 GHz.

In some aspects, the SCS may be equal to 5 MHz. In some implementations, the plurality of subcarriers may include 108 data subcarriers, 6 pilot subcarriers, 11 guard subcarriers, and 3 DC subcarriers, the plurality of subcarriers may be transformed into the time-varying signal based on a 128- point IFFT, and $f_s$=640 MHz. In some other implementations, the plurality of subcarriers may include 468 data subcarriers, 16 pilot subcarriers, 11 guard subcarriers, and 11 DC subcarriers, the plurality of subcarriers may be transformed into the time-varying signal based on a 512-point IFFT, and $f_s$=2.56 GHz. Still further, in some implementations, the plurality of subcarriers may include 468 data subcarriers, 16 pilot subcarriers, 23 guard subcarriers, and 5 DC subcarriers, the plurality of subcarriers may be transformed into the time-varying signal based on a 512-point IFFT, and $f_s$=2.56 GHz.

Another innovative aspect of the subject matter described in this disclosure can be implemented in a wireless communication device. In some implementations, the wireless communication device may include at least one memory and at least one processor communicatively coupled with the at least one memory and configured to cause the wireless communication device to perform operations including mapping, to a plurality of subcarriers, a PPDU conforming to a PPDU format associated with wireless communications on a carrier frequency below 7 GHz, where the plurality of subcarriers spans a bandwidth (BW) associated with the PPDU format; transforming the plurality of subcarriers into a time-varying signal at a sampling rate ($f_s$) higher than BW; and transmitting the time-varying signal, over a wireless channel, on a carrier frequency above 7 GHz.

Another innovative aspect of the subject matter described in this disclosure can be implemented as a method of wireless communication. The method may be performed by a wireless communication device and may include receiving a time-varying signal, over a wireless channel, on a carrier frequency above 7 GHz, where the time-varying signal carries a PPDU conforming to a PPDU format associated with wireless communications on a carrier frequency below 7 GHz; transforming the time-varying signal into a plurality of subcarriers spanning a bandwidth associated with the PPDU format; and de-mapping the PPDU from the plurality of subcarriers.

Another innovative aspect of the subject matter described in this disclosure can be implemented in a wireless communication device. In some implementations, the wireless communication device may include at least one memory and at least one processor communicatively coupled with the at least one memory and configured to cause the wireless communication device to perform operations including receiving a time-varying signal, over a wireless channel, on a carrier frequency above 7 GHz, where the time-varying signal carries a PPDU conforming to a PPDU format associated with wireless communications on a carrier frequency below 7 GHz; transforming the time-varying signal into a plurality of subcarriers spanning a bandwidth associated with the PPDU format; and de-mapping the PPDU from the plurality of subcarriers.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
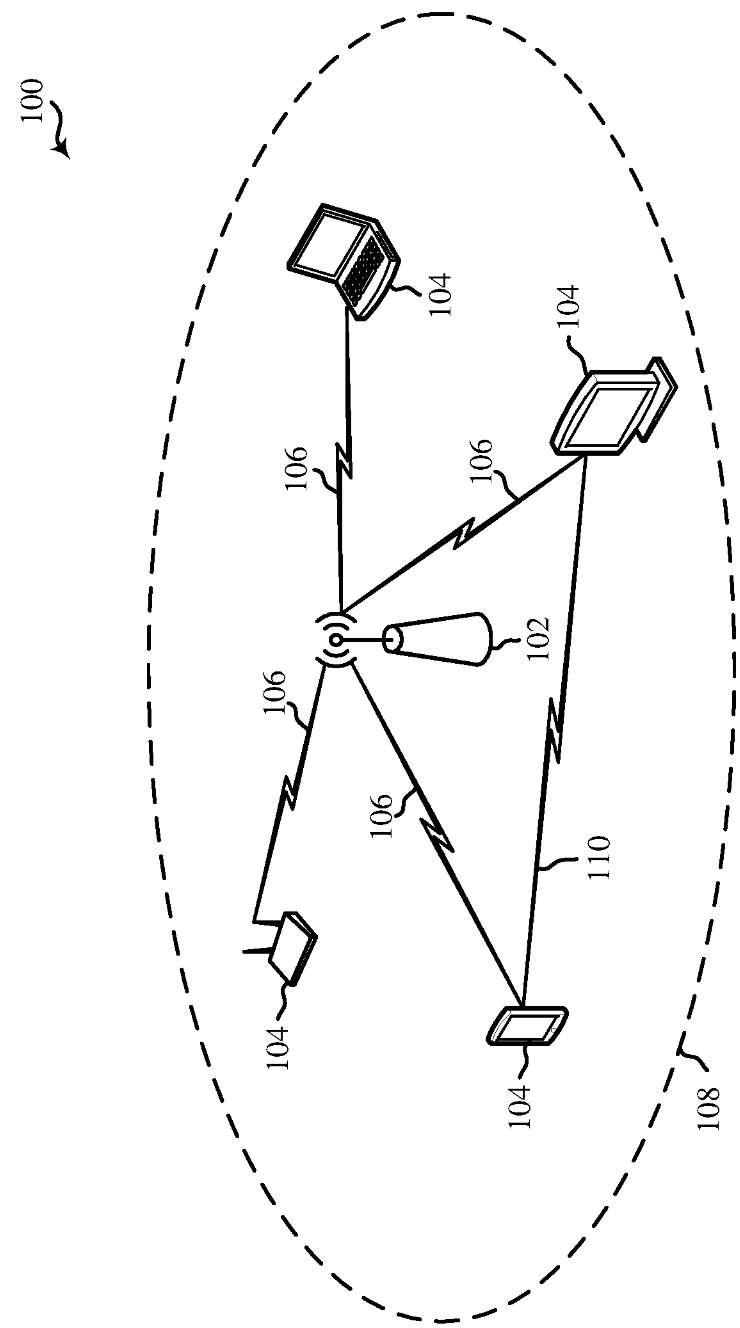
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (JOT) network.

As described above, new WLAN communication protocols are being developed to enable enhanced features for wireless communications on carrier frequencies above 7 GHz (such as in the 45 GHz or 60 GHz frequency bands). However, wireless communications on higher carrier frequencies may suffer from greater phase noise and path loss compared to wireless communications on lower frequency bands. For example, increasing the carrier frequency from 5.8 GHz to 60 GHz results in a 10× increase in phase noise. Aspects of the present disclosure recognize that the phase noise can be mitigated by increasing the subcarrier spacing (SCS) between modulated subcarriers. Existing WLAN packet formats include a legacy short training field (L-STF) that is modulated on every 4th subcarrier spanning a given bandwidth to support carrier frequency offset (CFO) estimations up to 2 subcarriers apart. Aspects of the present disclosure also recognize that the local oscillators (LOs) implemented by existing WLAN transmitters and receivers are required to be accurate up to ±20 ppm. As such, existing WLAN architectures can support CFOs up to ±40 ppm (between the transmitter and the receiver), which is equivalent to ±2.4 MHz in the 60 GHz frequency band and ±1.8 MHz in the 45 GHz frequency band. To support CFOs up to ±2.4 MHz, the SCS associated with L-STF should be greater than or equal to 1.2 MHz.

Various aspects relate generally to increasing carrier frequencies for wireless communications in WLANs, and more particularly, to packet designs and numerologies that support wireless communications on carrier frequencies above 7 GHz. In some aspects, a wireless communication device may up-clock a physical layer (PHY) convergence protocol (PLCP) protocol data unit (PPDU) for transmission on carrier frequencies above 7 GHz, where the PPDU conforms to an existing PPDU format associated with carrier frequencies below 7 GHz (also referred to as a "sub-7 GHz" frequency band). As used herein, the term "up-clocking" refers to increasing the frequency of a clock signal used to convert the PPDU between the frequency domain and the time domain (beyond a frequency ($f_0$) associated with the existing PPDU format), and the ratio (K) of the up-clocked frequency ($f_s$) to $f_0$ is referred to herein as the "up-clocking ratio" (where $$K = \frac{f_s}{f_0}$$

). For example, me clock signal may be provided to a digital-to-analog converter (DAC) that samples the output of an inverse fast Fourier transform (IFFT). The IFFT transforms a number (N) of modulated subcarriers, representing the PPDU, to N time-domain samples. In some aspects, the ratio of the clock signal frequency $f_s$ to the IFFT size ($N_{IFFT}$) may result in an SCS greater than or equal to 1.2 MHz, where the SCS represents a spacing between the subcarriers on which a PHY preamble (including L-STF) of the PPDU is modulated. More specifically, the SCS as a result of up-clocking ($SCS_U$) may be a multiple of an SCS associated with the existing PPDU format ($SCS_0$), where $SCS_U$=K*$SCS_0$.

Particular implementations of the subject matter described in this disclosure can be implemented to realize one or more of the following potential advantages. By up-clocking PPDUs that conform to existing PPDU formats, aspects of the present disclosure can leverage existing WLAN hardware to increase the carrier frequencies on which such PPDUs are transmitted (such as to the 60 GHz or 45 GHz frequency bands). As described above, existing WLAN architectures can support CFO estimation in the 60 GHz frequency band if the SCS associated with L-STF is greater than or equal to 1.2 MHz. The SCS of a PPDU depends, in part, on the tone plan used to map the PPDU to the N subcarriers, and more particularly, the size of the IFFT associated with the tone plan. Existing sub-7 GHz tone plans support a number of IFFT sizes, including $N_{IFFT}$=512, 256, 128, and 64, among other examples. Aspects of the present disclosure recognize that, given a PPDU mapped to an existing sub-7 GHz tone plan, a suitable $f_s$ can be selected so that $$SCS = \frac{f_s}{N_{IFFT}} \geq 1.2 \text{ MHz}.$$

Accordingly, the up-clocking techniques described herein allow PPDUs to be transmitted at significantly higher clock rates (such as $f_s$=1.28 GHz, 1.92 GHz, or 2.56 GHz) based on existing sub-7 GHz IFFTs (such as $N_{IFFT}$=512) or at existing sub-7 GHz clock rates (such as $f_s$=320 MHz or 640 MHz) based on smaller sub-7 GHz IFFTs (such as $N_{IFFT}$=256 or 128).

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
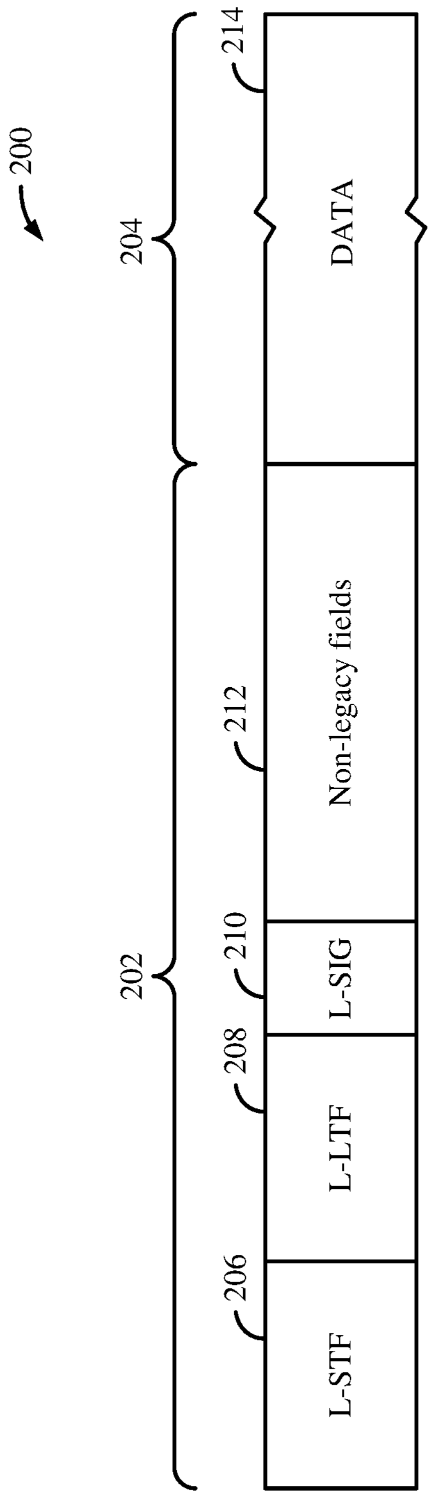
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
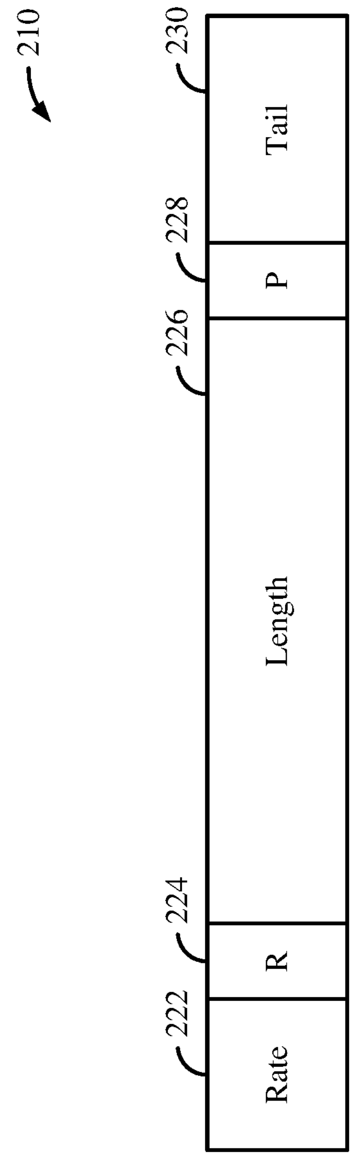
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
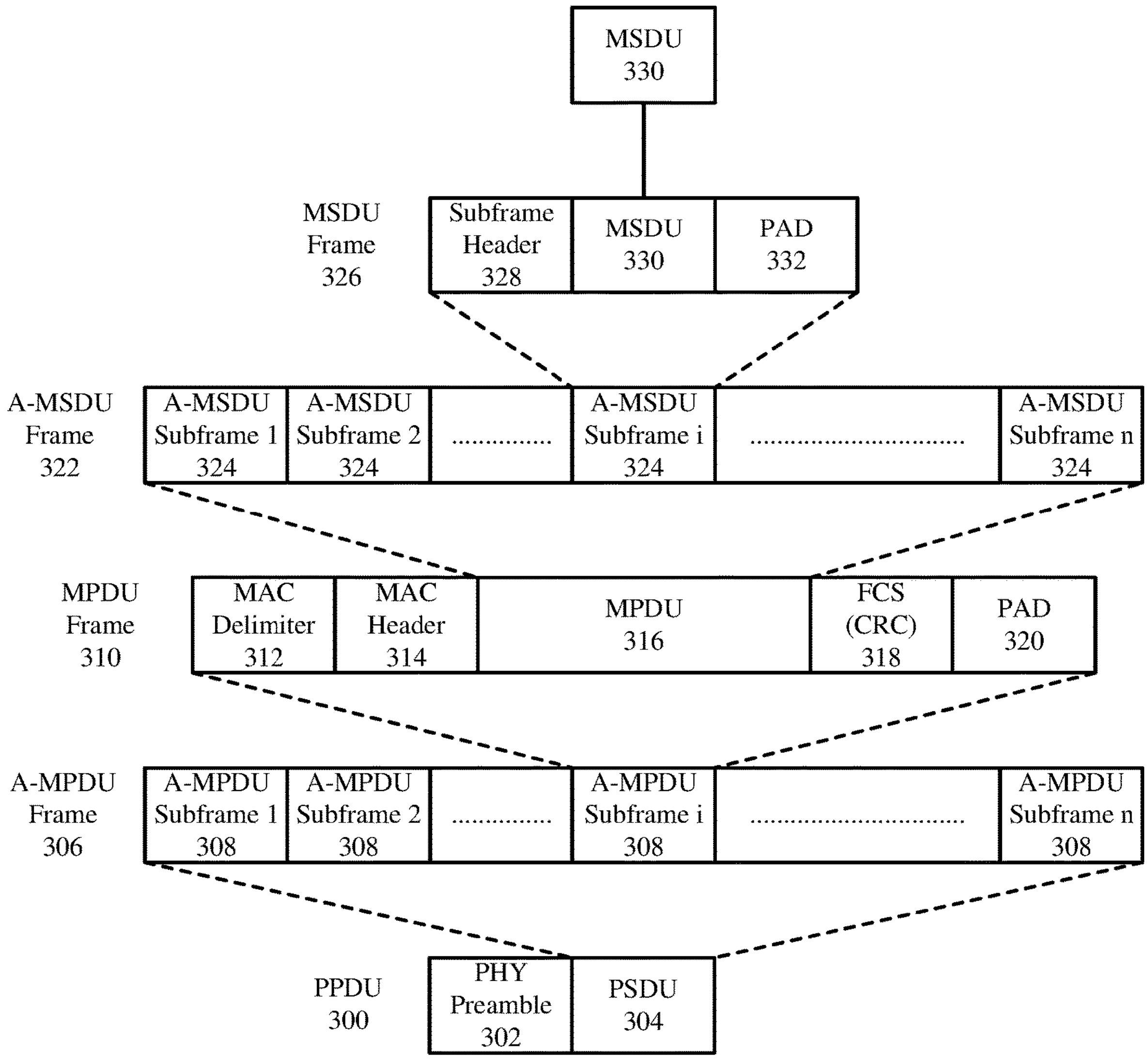
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
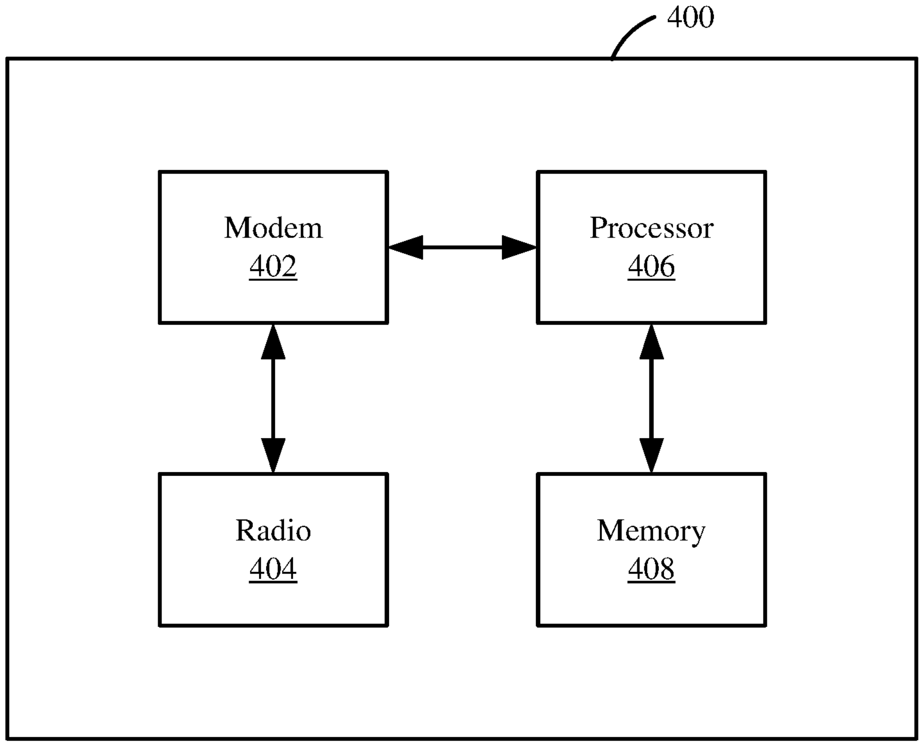
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
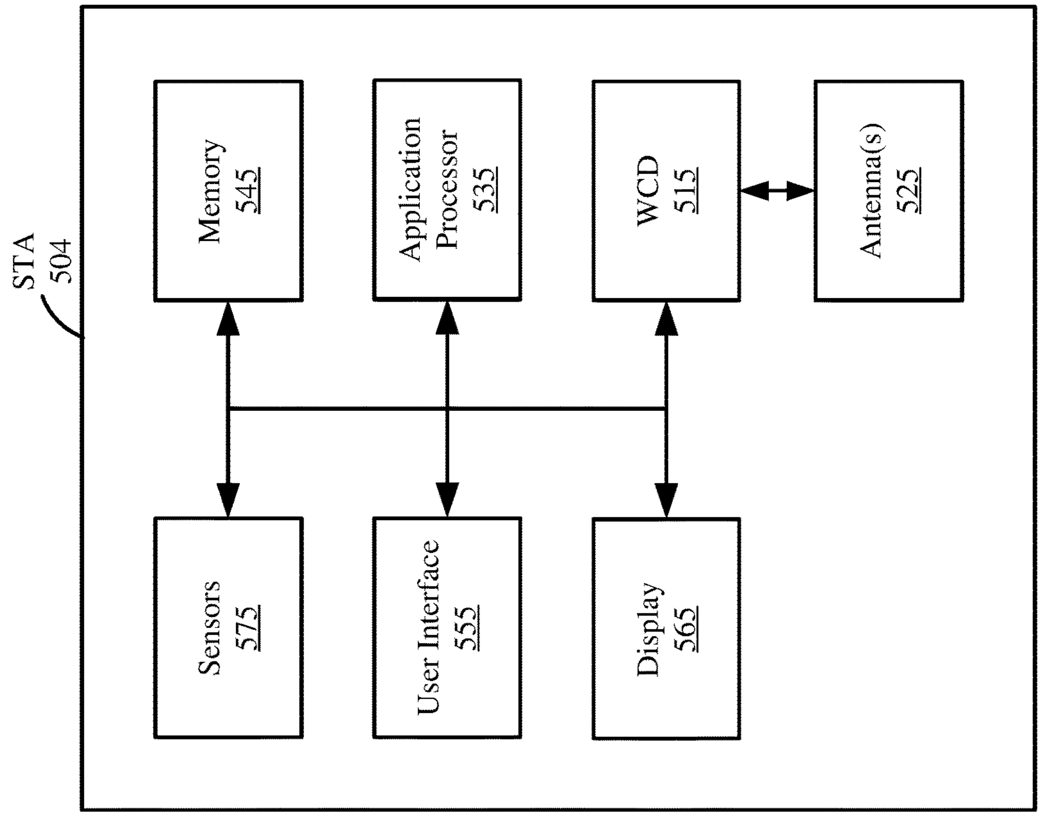
FIG. 5B shows a block diagram of an example STA.
Figure 5A:
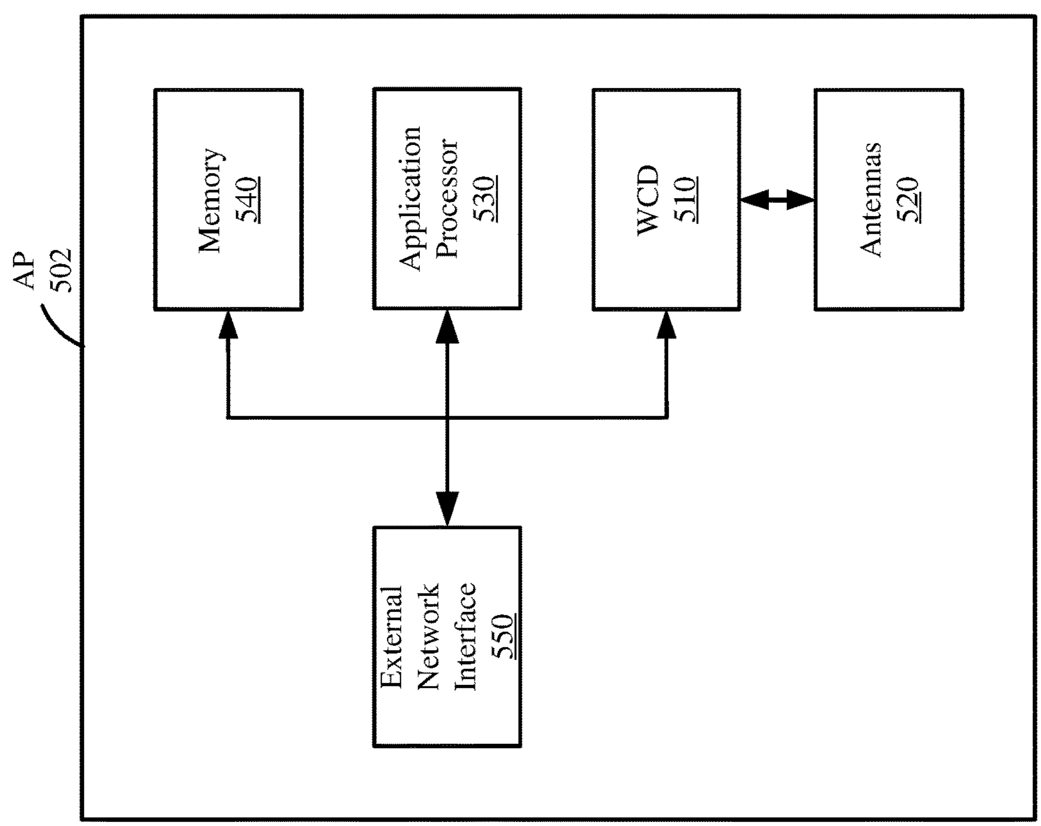
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, new WLAN communication protocols are being developed to enable enhanced features for wireless communications on carrier frequencies above 7 GHz (such as in the 45 GHz or 60 GHz frequency bands). However, wireless communications on higher carrier frequencies may suffer from greater phase noise and path loss compared to wireless communications on lower frequency bands. For example, increasing the carrier frequency from 5.8 GHz to 60 GHz results in a 10× increase in phase noise. Aspects of the present disclosure recognize that the phase noise can be mitigated by increasing the SCS between modulated subcarriers. Existing WLAN packet formats include an L-STF (such as the L-STF 206 of FIG. 2A) that is modulated on every 4th subcarrier spanning a given bandwidth to support CFO estimations up to 2 subcarriers apart. Aspects of the present disclosure also recognize that the LOs implemented by existing WLAN transmitters and receivers are required to be accurate up to ±20 ppm. As such, existing WLAN architectures can support CFOs up to ±40 ppm (between the transmitter and the receiver), which is equivalent to ±2.4 MHz in the 60 GHz frequency band and ±1.8 MHz in the 45 GHz frequency band. To support CFOs up to ±2.4 MHz, the SCS associated with L-STF should be greater than or equal to 1.2 MHz.

Various aspects relate generally to increasing carrier frequencies for wireless communications in WLANs, and more particularly, to packet designs and numerologies that support wireless communications on carrier frequencies above 7 GHz. In some aspects, a wireless communication device may up-clock a PPDU for transmission on carrier frequencies above 7 GHz, where the PPDU conforms to an existing PPDU format associated with carrier frequencies below 7 GHz (also referred to as a "sub-7 GHz" frequency band). As used herein, the term "up-clocking" refers to increasing the frequency of a clock signal used to convert the PPDU between the frequency domain and the time domain (beyond a frequency ($f_0$) associated with the existing PPDU format), and the ratio (K) of the up-clocked frequency ($f_s$) to $f_0$ is referred to herein as the "up-clocking ratio" (where $$K = \frac{f_s}{f_0}$$

). For example, the clock signal may be provided to a DAC that samples the output of an IFFT. The IFFT transforms a number (N) of modulated subcarriers, representing the PPDU, to N time-domain samples. In some aspects, the ratio of the clock signal frequency $f_s$ to the IFFT size ($N_{IFFT}$) may result in an SCS greater than or equal to 1.2 MHz, where the SCS represents a spacing between the subcarriers on which a PHY preamble (including L-STF) of the PPDU is modulated. More specifically, the SCS as a result of up-clocking ($SCS_U$) may be a multiple of an SCS associated with the existing PPDU format ($SCS_0$), where $SCS_U = K*SCS_0$.

Particular implementations of the subject matter described in this disclosure can be implemented to realize one or more of the following potential advantages. By up-clocking PPDUs that conform to existing PPDU formats, aspects of the present disclosure can leverage existing WLAN hardware to increase the carrier frequencies on which such PPDUs are transmitted (such as to the 60 GHz or 45 GHz frequency bands). As described above, existing WLAN architectures can support CFO estimation in the 60 GHz frequency band if the SCS associated with L-STF is greater than or equal to 1.2 MHz. The SCS of a PPDU depends, in part, on the tone plan used to map the PPDU to the N subcarriers, and more particularly, the size of the IFFT associated with the tone plan. Existing sub-7 GHz tone plans support a number of IFFT sizes, including $N_{IFFT}$=512, 256, 128, and 64, among other examples. Aspects of the present disclosure recognize that, given a PPDU mapped to an existing sub-7 GHz tone plan, a suitable $f_s$ can be selected so that $$SCS = \frac{f_s}{N_{IFFT}} \geq 1.2 \text{ MHz}.$$

Accordingly, the up-clocking techniques described herein allow PPDUs to be transmitted at significantly higher clock rates (such as $f_s$=1.28 GHz, 1.92 GHz, or 2.56 GHz) based on existing sub-7 GHz IFFTs (such as $N_{IFFT}$=512) or at existing sub-7 GHz clock rates (such as $f_s$=320 MHz or 640 MHz) based on smaller sub-7 GHz IFFTs (such as $N_{IFFT}$=256 or 128).

Figure 6:
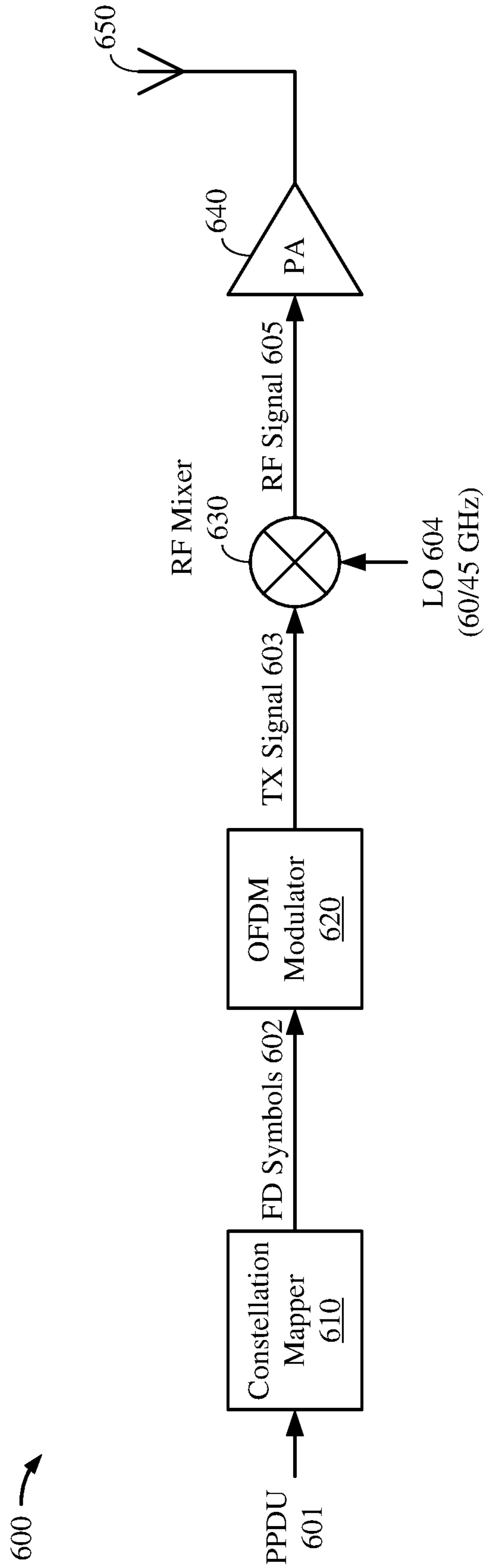
FIG. 6 shows a block diagram of an example transmit (TX) processing chain for a wireless communication device, according to some implementations.

FIG. 6 shows a block diagram of an example TX processing chain 600 for a wireless communication device, according to some implementations. In some aspects, the wireless communication device may be one example of the wireless communication device 400 of FIG. 4. The TX processing chain 600 is configured to process a PPDU 601 for transmission, as a radio frequency (RF) signal 605, over a wireless channel. In some implementations, the PPDU 601 may be one example of the PPDU 300 of FIG. 3. For simplicity, only a single spatial stream of the TX processing chain 600 is depicted in FIG. 6. In actual implementations, the TX processing chain 600 may include any number of spatial streams.

The TX processing chain 600 includes a constellation mapper 610, an orthogonal frequency-division multiplexing (OFDM) modulator 620, an RF mixer 630, and a power amplifier (PA) 640. The constellation mapper 610 maps the PPDU 601 to one or more frequency-domain (FD) symbols 602 associated with a modulation scheme. Example suitable modulation schemes include binary phase-shift keying (BPSK), quadrature phase-shift keying (QPSK), and quadrature amplitude modulation (QAM). The OFDM modulator 620 modulates the FD symbols 602 onto a set of orthogonal subcarriers and converts the modulated subcarriers to a time-varying TX signal 603. The RF mixer 630 up-converts the TX signal 603 to a carrier frequency, and the power amplifier 640 amplifies the resulting RF signal 605 for transmission via one or more antennas 650. For example, the RF mixer 640 may modulate the TX signal 603 onto an LO signal 604 that oscillates at the carrier frequency. In the example of FIG. 6, the carrier frequency associated with the LO signal 604 is shown to be higher than 7 GHz. In some implementations, the carrier frequency may be in the 60 GHz frequency band. In some other implementations, the carrier frequency may be in the 45 GHz frequency band.

As described above, many existing WLAN architectures are designed for wireless communications on carrier frequencies below 7 GHz (such as in the 2.4 GHz, 5 GHz, or 6 GHz frequency bands). In some aspects, existing WLAN hardware may be repurposed to support wireless communications on carrier frequencies above 7 GHz. For example, the TX processing chain 600 may receive the LO signal 604 from a local oscillator that is accurate up to ±20 ppm. However, increasing the carrier frequency of the LO signal 604 also increases the phase noise associated with the RF signal 605. For example, operating the local oscillator at 60 GHz can result in a carrier frequency offset (CFO) of ±2.4 MHz between the transmitter and the receiver. As described with reference to FIG. 2A, the PHY preamble of the PPDU 601 includes an L-STF that can be used for CFO estimation. More specifically, L-STF is modulated on every 4th subcarrier spanning a given bandwidth to support CFO estimations up to 2 subcarriers apart. According to existing versions of the IEEE 802.11 standard, L-STF has a 1×symbol duration associated with an SCS equal to 312.5 KHz. As used herein, the term "1×SCS" refers to the subcarrier spacing between the subcarriers to which L-STF is mapped. Thus, to support CFOs up to ±2.4 MHz, the 1×SCS associated with the PPDU 601 should be greater than or equal to 1.2 MHz.

Aspects of the present disclosure recognize that any SCS greater than or equal to 1.2 MHz may not be suitable for wireless communications on sub-7 GHz carrier frequencies. As such, existing WLAN communication protocols for sub-7 GHz wireless communications (such as the IEEE 802.11be, 11ax, 11ac, and earlier amendments of the IEEE 802.11 standard) do not define a PPDU format or tone plan having an SCS greater than or equal to 1.2 MHz. Aspects of the present disclosure also recognize that designing new PPDU formats or tone plans for wireless communications on carrier frequencies above 7 GHz may require new WLAN hardware or substantial redesigns of existing WLAN architectures, which may be cost prohibitive or limit backwards compatibility with older versions of the IEEE 802.11 standard. In some aspects, the TX processing chain 600 may receive a PPDU 601 that is formatted for transmission on a sub-7 GHz carrier frequency and may up-clock the PPDU 601 to a wider bandwidth that is suitable for transmission on a carrier frequency above 7 GHz (such as in the 60 GHz or 45 GHz frequency bands). For example, the wider bandwidth is achieved by spreading out the subcarriers to which the PPDU 601 is mapped. Thus, in some implementations, the TX processing chain 600 may up-clock the PPDU 601 so that the 1×SCS associated with the PPDU 601 is greater than or equal to 1.2 MHz.

In some implementations, the PPDU 601 may conform to a PPDU format defined by the IEEE 802.11ac amendment of the IEEE 802.11 standard (also referred to as an "11ac PPDU format"). For example, the PPDU 601 may conform to an 11ac PPDU format associated with a 20 MHz, 40 MHz, 80 MHz, 80+80 MHz, or 160 MHz channel bandwidth (in a sub-7 GHz frequency band) and may be up-clocked for transmission over an 80 MHz, 160 MHz, 320 MHz, 480 MHz, 640 MHz, 960 MHz, 1.28 GHz, 1.92 GHz, or 2.56 GHz bandwidth wireless channel in the 60 GHz or 45 GHz frequency band. In some other implementations, the PPDU 601 may conform to a PPDU format defined by the IEEE 802.11be (or 11ax) amendment of the IEEE 802.11 standard (also referred to as an "11be PPDU format"). For example, the PPDU 601 may conform to an 11be PPDU format associated with a 20 MHz, 40 MHz, or 80 MHz channel bandwidth (in a sub-7 GHz frequency band) and may be up-clocked for transmission over an 80 MHz, 160 MHz, 320

MHz, 480 MHz, 640 MHz, 960 MHz, 1.28 GHz, 1.92 GHz, or 2.56 GHz bandwidth wireless channel in the 60 GHz or 45 GHz frequency band.

Figure 7:
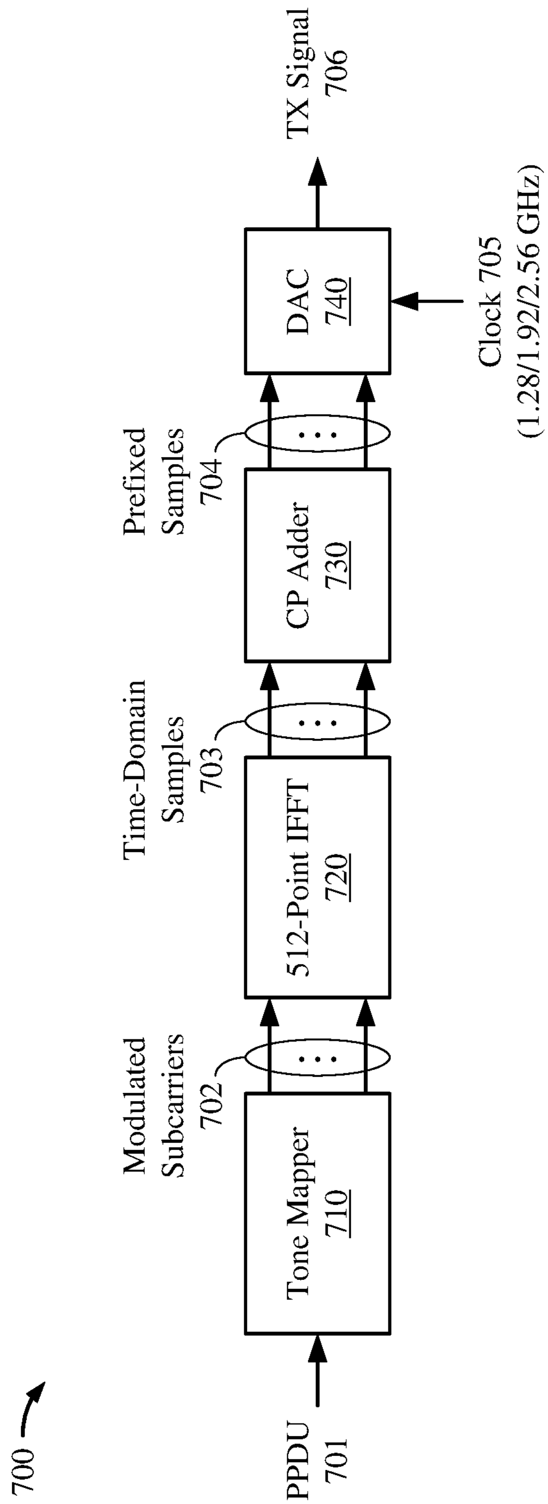
FIG. 7 shows a block diagram of an example orthogonal frequency-division multiplexing (OFDM) up-clocking system, according to some implementations.

FIG. 7 shows a block diagram of an example OFDM up-clocking system 700, according to some implementations. In some aspects, the OFDM up-clocking system 700 may be configured to up-clock a PPDU 701 to a TX signal 706 suitable for transmission on carrier frequencies above 7 GHz (such as in the 60 GHz or 45 GHz frequency bands). More specifically, the OFDM up-clocking system 700 may map the PPDU 701 onto a set of orthogonal subcarriers associated with a 1×SCS greater than or equal to 1.2 MHz. In some implementations, the OFDM up-clocking system 700 may be one example of the OFDM modulator 620 of FIG. 6. With reference for example to FIG. 6, the PPDU 701 and the TX signal 706 may be examples of the FD symbols 602 and the TX signal 603, respectively.

The OFDM up-clocking system 700 includes a tone mapper 710, a 512-point IFFT 720, a cyclic prefix (CP) adder 730, and a DAC 740. In the example of FIG. 7, the tone mapper 710 is configured to map the PPDU 701 to 512 subcarriers associated with a given bandwidth to produce 512 modulated subcarriers 702. In some implementations, the PPDU 701 may conform to an 11ac PPDU format associated with a 160 MHz channel bandwidth. In such implementations, the 512 subcarriers may include 468 data subcarriers, 16 pilot subcarriers, 11 guard subcarriers, and 11 direct current (DC) subcarriers. In some other implementations, the PPDU 701 may conform to an 11be PPDU format associated with a 40 MHz channel bandwidth. In such implementations, the 512 subcarriers may include 468 data subcarriers, 16 pilot subcarriers, 23 guard subcarriers, and 5 DC subcarriers. The 512-point IFFT 720 transforms the 512 modulated subcarriers 702, from the frequency domain to the time domain, as 512 time-domain samples 703. The CP adder 730 adds a cyclic prefix to the time-domain samples 703 to produce a number of prefixed samples 704.

The DAC 740 converts the prefixed samples 704 to the TX signal 706 based on a clock signal 705. More specifically, the frequency of the clock signal 705 controls the sampling rate ($f_s$) of the DAC 740. Further, the SCS associated with the TX signal 706 depends on the sampling rate $f_s$ of the DAC 740 and the size ($N_{IFFT}$) of the IFFT 720, where $$SCS = \frac{f_s}{N_{IFFT}}.$$

In some aspects, tile clock signal 705 may be up-clocked to a frequency higher than 160 MHz (such as when the PPDU 701 conforms to the 11ac PPDU format associated with a 160 MHz channel bandwidth) or higher than 40 MHz (such as when the PPDU 701 conforms to the 11be PPDU format associated with a 40 MHz channel bandwidth). More specifically, the frequency of the clock signal 705 may be configured to ensure that the 1×SCS associated with the TX signal 706 is greater than or equal to 1.2 MHz.

In some implementations, the clock signal 705 may be up-clocked to 1.28 GHz, which results in a 1×SCS equal to 2.5 MHz. In some other implementations, the clock signal 705 may be up-clocked to 1.92 GHz, which results in a 1×SCS equal to 3.75 MHz. Still further, in some implementations, the clock signal 705 may be up-clocked to 2.56 GHz, which results in a 1×SCS equal to 5 MHz. Table 1 summarizes example parameters for up-clocking a PPDU 701 conforming to an 11ac PPDU format associated with a 160 MHz channel bandwidth. Table 2 summarizes example parameters for up-clocking a PPDU 701 conforming to an 11be PPDU format associated with a 40 MHz channel bandwidth.

TABLE 1

| | Baseline 11ac PPDU Format for 160 MHz Channel Bandwidth | | |
|---|---|---|---|
| Bandwidth | 1.28 GHz | 1.92 GHz | 2.56 GHz |
| Up-clocking | 8x | 12x | 16x |
| IFFT Size | 512 | 512 | 512 |
| # Data Subcarriers | 468 | 468 | 468 |
| # Pilot Subcarriers | 16 | 16 | 16 |
| # Guard/DC Subcarriers | 11/11 | 11/11 | 11/11 |
| Subcarrier Spacing | 2.5 MHz | 3.75 MHz | 5 MHz |
| Symbol Duration | 400 ns | 266.67 ns | 200 ns |
| Cyclic Prefix Duration | 100 ns (long)<br>50 ns (short) | 66.67 ns (long)<br>33.33 ns (short) | 50 ns (long)<br>25 ns (short) |
| Data Rate with 16QAM ¾ | 3.12 Gbps | 4.68 Gbps | 6.24 Gbps |

TABLE 2

| | Baseline 11be PPDU Format for 40 MHz Channel Bandwidth | | |
|---|---|---|---|
| Bandwidth | 1.28 GHz | 1.92 GHz | 2.56 GHz |
| Up-clocking | 32x | 48x | 64x |
| IFFT Size | 512 | 512 | 512 |
| # Data Subcarriers | 468 | 468 | 468 |
| # Pilot Subcarriers | 16 | 16 | 16 |
| # Guard/DC Subcarriers | 23/5 | 23/5 | 23/5 |
| Subcarrier Spacing | 2.5 MHz | 3.75 MHz | 5 MHz |
| Symbol Duration | 400 ns | 266.67 ns | 200 ns |
| Cyclic Prefix Duration | 100 ns (long)<br>50 ns (short) | 66.67 ns (long)<br>33.33 ns (short) | 50 ns (long)<br>25 ns (short) |
| Data Rate with 16QAM ¾ | 3.12 Gbps | 4.68 Gbps | 6.24 Gbps |

Figure 8A:
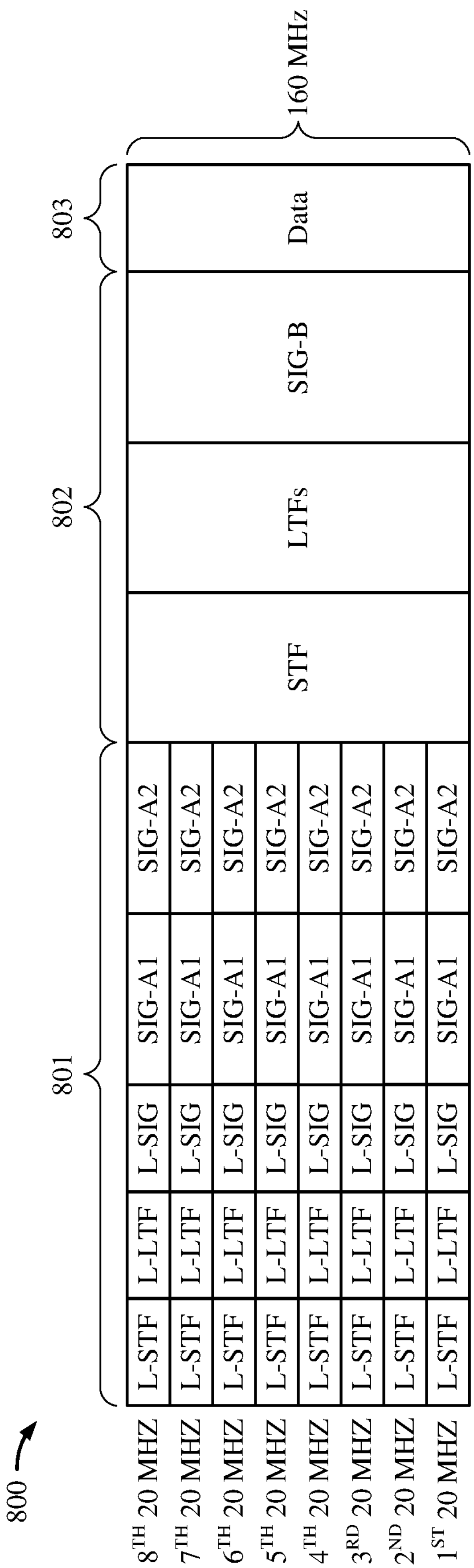
FIG. 8A shows an example PPDU formatted in accordance with a legacy PPDU format.

FIG. 8A shows an example PPDU 800 formatted in accordance with a legacy PPDU format. In the example of FIG. 8A, the legacy PPDU format is an 11ac PPDU format associated with a 160 MHz channel bandwidth. The PPDU 800 includes a PHY preamble, having a first portion 801 and a second portion 802, followed by a data portion 803. The first preamble portion 801 includes an L-STF, an L-LTF, an L-SIG, a first non-legacy signal field (SIG-A) spanning a first symbol (SIG-A1) and a second symbol (SIG-A2). The second preamble portion 802 includes a non-legacy short training field (STF), one or more non-legacy long training fields (LTFs), and a second non-legacy signal field (SIG-B).

The IEEE 802.11ac amendment of the IEEE 802.11 standard defines the non-legacy fields SIG-A1, SIG-A2, STF, LTFs, and SIG-B as Very High Throughput (VHT) fields VHT-SIG-A1, VHT-SIG-A2, VHT-STF, VHT-LTFs, and VHT-SIG-B, respectively. In some implementations, one or more of the non-legacy fields may be repurposed to carry signaling or other information specific to wireless communications on carrier frequencies above 7 GHz (such as in the 60 GHz or 45 GHz frequency bands). As shown in FIG. 8A, the first preamble portion 801 is duplicated on eight 20 MHz sub-bands spanning the 160 MHz bandwidth. According to the 11ac PPDU format, the first preamble portion 801, the second preamble portion 802, and the data portion 802 are mapped to the same subcarriers.

Figure 8B:
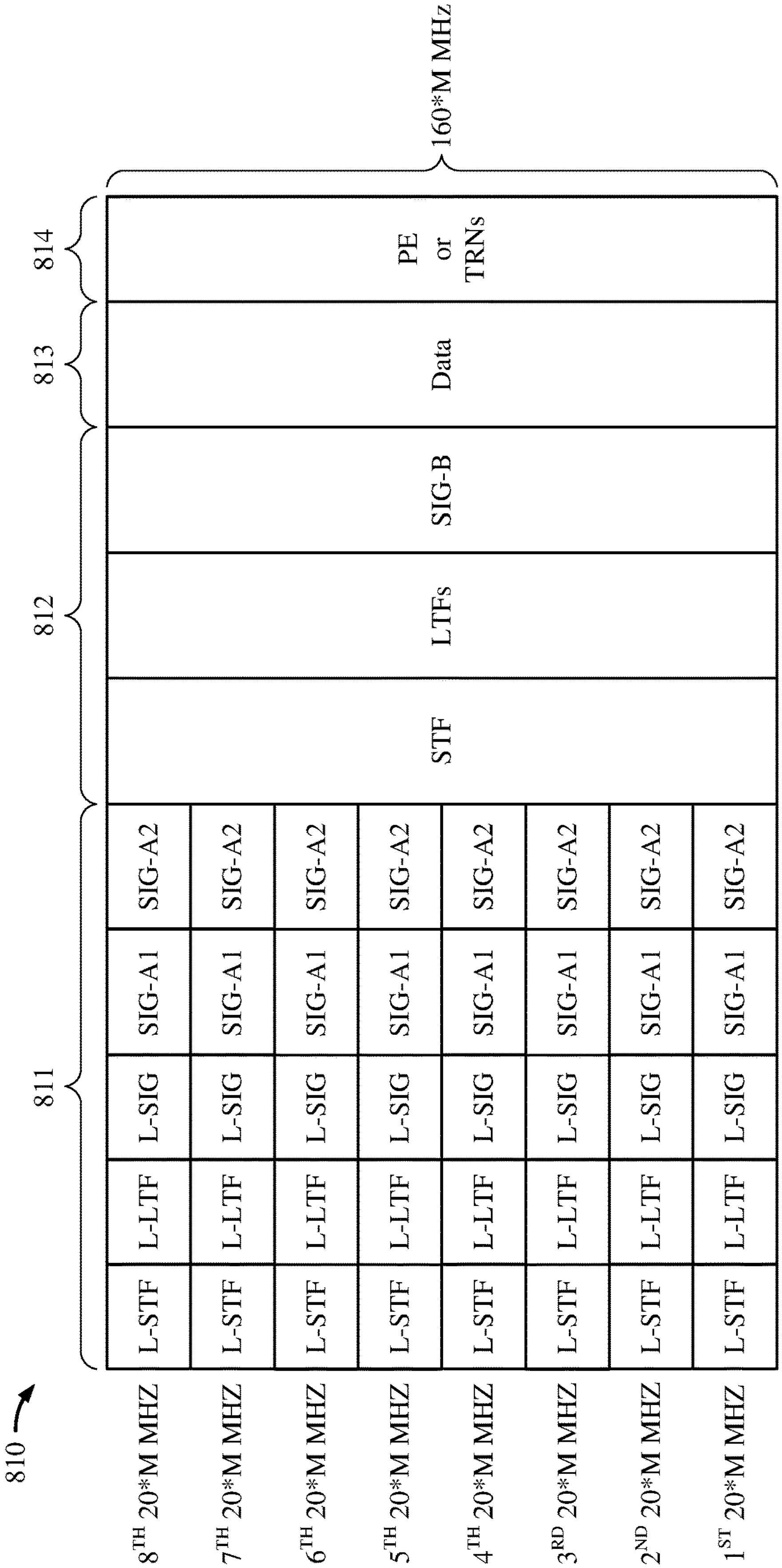
FIG. 8B shows an example up-clocked PPDU based on the PPDU format depicted in FIG. 8A, according to some implementations.

FIG. 8B shows an example up-clocked PPDU 810 based on the PPDU format depicted in FIG. 8A, according to some implementations. The PPDU 810 includes a PHY preamble, having a first portion 811 and a second portion 812, followed by a data portion 813. In some implementations, a packet extension (PE) or training (TRN) field 814 may be added to the PPDU 811 to support enhanced features for wireless communications on carrier frequencies above 7 GHz. In some aspects, the PPDU 810 may represent an up-clocking of the PPDU 800 by a factor of M. As such, the first preamble portion 811, the second preamble portion 812, and the data portion 813 may be examples of the first preamble portion 801, the second preamble portion 802, and the data portion 803, respectively, of FIG. 8A.

In some aspects, the up-clocking may be performed by the OFDM up-clocking system 700 of FIG. 7. In some implementations, the OFDM up-clocking system 700 may up-clock the PPDU 800 by a factor of 8. As a result, the data portion 813 is spread over a 1.28 GHz bandwidth and the first preamble portion 811 is duplicated on eight 160 MHz sub-bands spanning the 1.28 GHz bandwidth. In some other implementations, the OFDM up-clocking system 700 may up-clock the PPDU 800 by a factor of 12. As a result, the data portion 813 is spread over a 1.92 GHz bandwidth and the first preamble portion 811 is duplicated on eight 240 MHz sub-bands spanning the 1.92 GHz bandwidth. Still further, in some implementations, the OFDM up-clocking system 700 may up-clock the PPDU 800 by a factor of 16. As a result, the data portion 813 is spread over a 2.56 GHz bandwidth and the first preamble portion 811 is duplicated on eight 320 MHz sub-bands spanning the 2.56 GHz bandwidth.

Figure 9A:
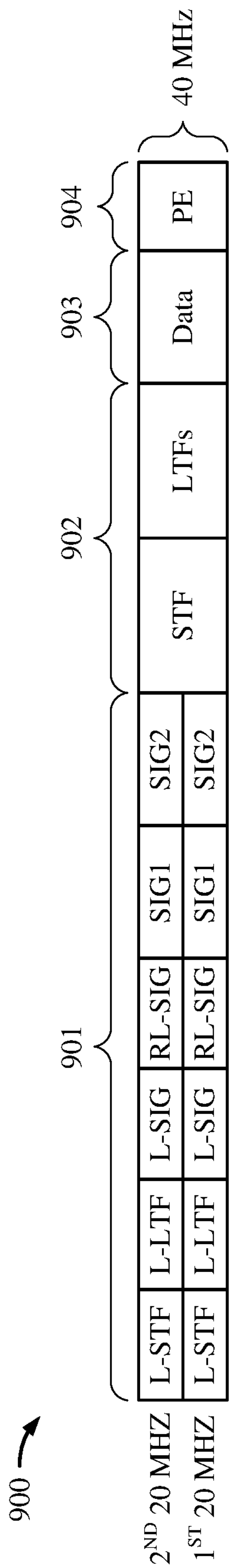
FIG. 9A shows another example PPDU formatted in accordance with a legacy PPDU format.

FIG. 9A shows another example PPDU 900 formatted in accordance with a legacy PPDU format. In the example of FIG. 9A, the legacy PPDU format is an 11be PPDU format associated with a 40 MHz channel bandwidth. The PPDU 900 includes a PHY preamble, having a first portion 901 and a second portion 902, followed by a data portion 903 and a PE 904. The first preamble portion 901 includes an L-STF, an L-LTF, an L-SIG, an RL-SIG, a first non-legacy signal field (SIG1), and a second non-legacy signal field (SIG2). The second preamble portion 902 includes a non-legacy short training field (STF) and one or more non-legacy long training fields (LTFs).

The IEEE 802.11be amendment of the IEEE 802.11 standard defines the first non-legacy signal field SIG1 as a universal signal field (U-SIG) and defines the remaining non-legacy fields SIG2, STF, and LTFs as Extremely High Throughput (EHT) fields EHT-SIG, EHT-STF, and EHT-LTFs, respectively. In some implementations, one or more of the non-legacy fields may be repurposed to carry signaling or other information specific to wireless communications on carrier frequencies above 7 GHz (such as in the 60 GHz or 45 GHz frequency bands). As shown in FIG. 9A, the first preamble portion 901 is duplicated on two 20 MHz sub-bands spanning the 40 MHz bandwidth. According to the 11be PPDU format, the data portion 903 (and the second preamble portion 902) is mapped to each contiguous data subcarrier associated with a 512-subcarrier tone plan. In contrast, L-STF is mapped to every 4th data subcarrier associated with a 64-subcarrier tone plan (duplicated 2× in the frequency domain) while the remainder of the first preamble portion 901 is mapped to each contiguous data subcarrier associated with the 64-subcarrier tone plan. As such, the SCS associated with L-STF is 4× larger than the SCS associated with the data portion 903.

Figure 9B:
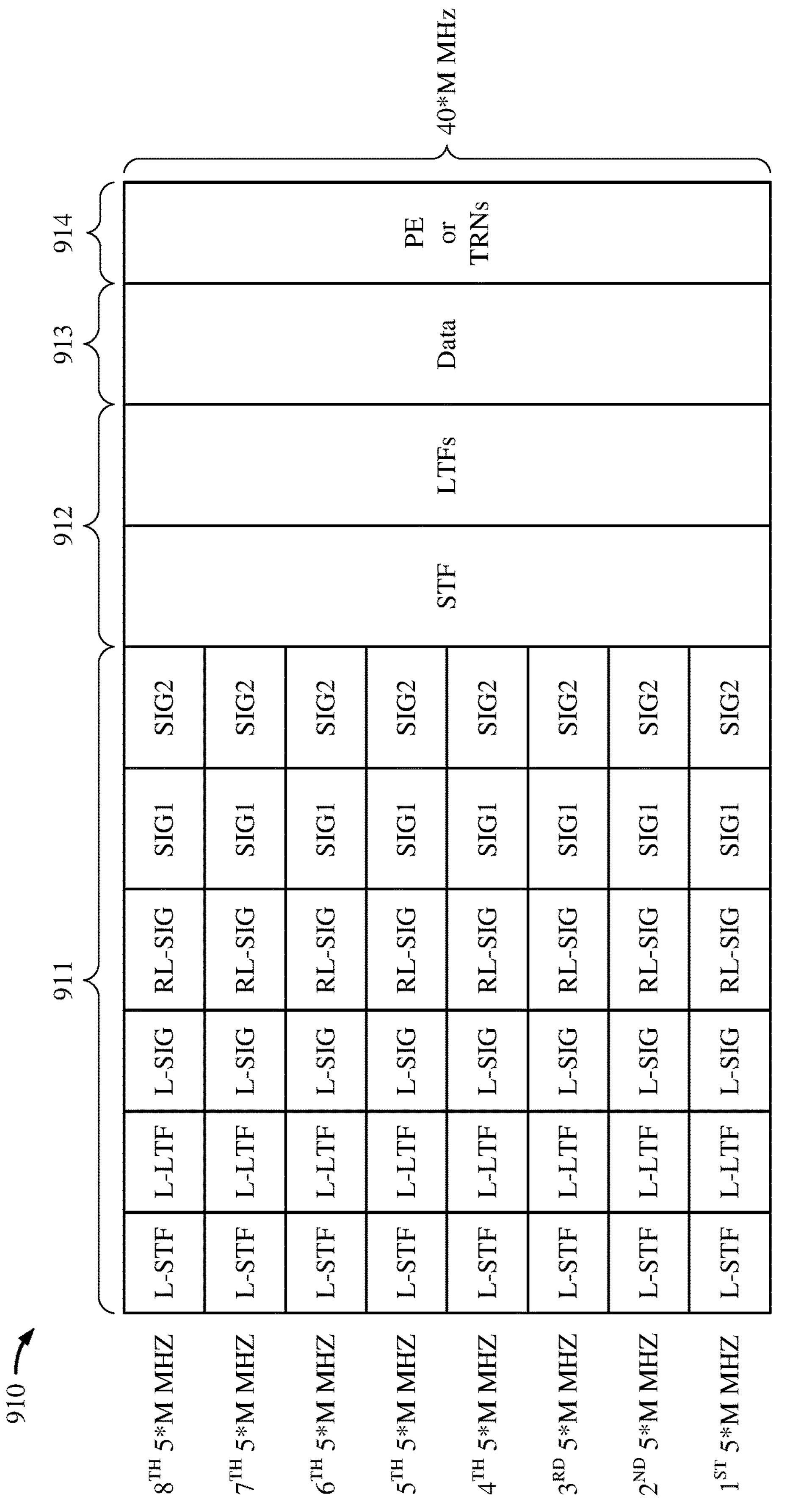
FIG. 9B shows an example up-clocked PPDU based on the PPDU format depicted in FIG. 9A, according to some implementations.

FIG. 9B shows an example up-clocked PPDU 910 based on the PPDU format depicted in FIG. 9A, according to some implementations. The PPDU 910 includes a PHY preamble, having a first portion 911 and a second portion 912, followed by a data portion 913 and a PE or TRN field 914. In some implementations, the PPDU 910 may represent an up-clocking of the PPDU 900 by a factor of M. As such, the first preamble portion 911, the second preamble portion 912, the data portion 913, and the PE or TRN field 914 may be examples of the first preamble portion 901, the second preamble portion 902, the data portion 903, and the PE 904, respectively, of FIG. 9A. As described with reference to FIG. 9A, the SCS associated with L-STF is 4× larger than the SCS associated with the data portion 903. Thus, the first preamble portion 901 can be up-clocked by a factor of M/4, and duplicated 4× in the frequency domain, to achieve the same SCS in L-STF as in the data portion 913.

In some aspects, the up-clocking may be performed by the OFDM up-clocking system 700 of FIG. 7. In some implementations, the OFDM up-clocking system 700 may up-clock the first preamble portion 901 by a factor of 8 and may up-clock the remainder of the PPDU 900 by a factor of 32. As a result, the data portion 913 is spread over a 1.28 GHz bandwidth and the first preamble portion 911 is duplicated on eight 40 MHz sub-bands spanning the 1.28 GHz bandwidth. In some other implementations, the OFDM up-clocking system 700 may up-clock the first preamble portion 901 by a factor of 12 and may up-clock the remainder of the PPDU 900 by a factor of 48. As a result, the data portion 913 is spread over a 1.92 GHz bandwidth and the first preamble portion 911 is duplicated on eight 60 MHz sub-bands spanning the 1.92 GHz bandwidth. Still further, in some implementations, the OFDM up-clocking system 700 may up-clock the first preamble portion 901 by a factor of 16 and may up-clock the remainder of the PPDU 900 by a factor of 64. As a result, the data portion 913 is spread over a 2.56 GHz bandwidth and the first preamble portion 911 is duplicated on eight 80 MHz sub-bands spanning the 2.56 GHz bandwidth.

Figure 10:
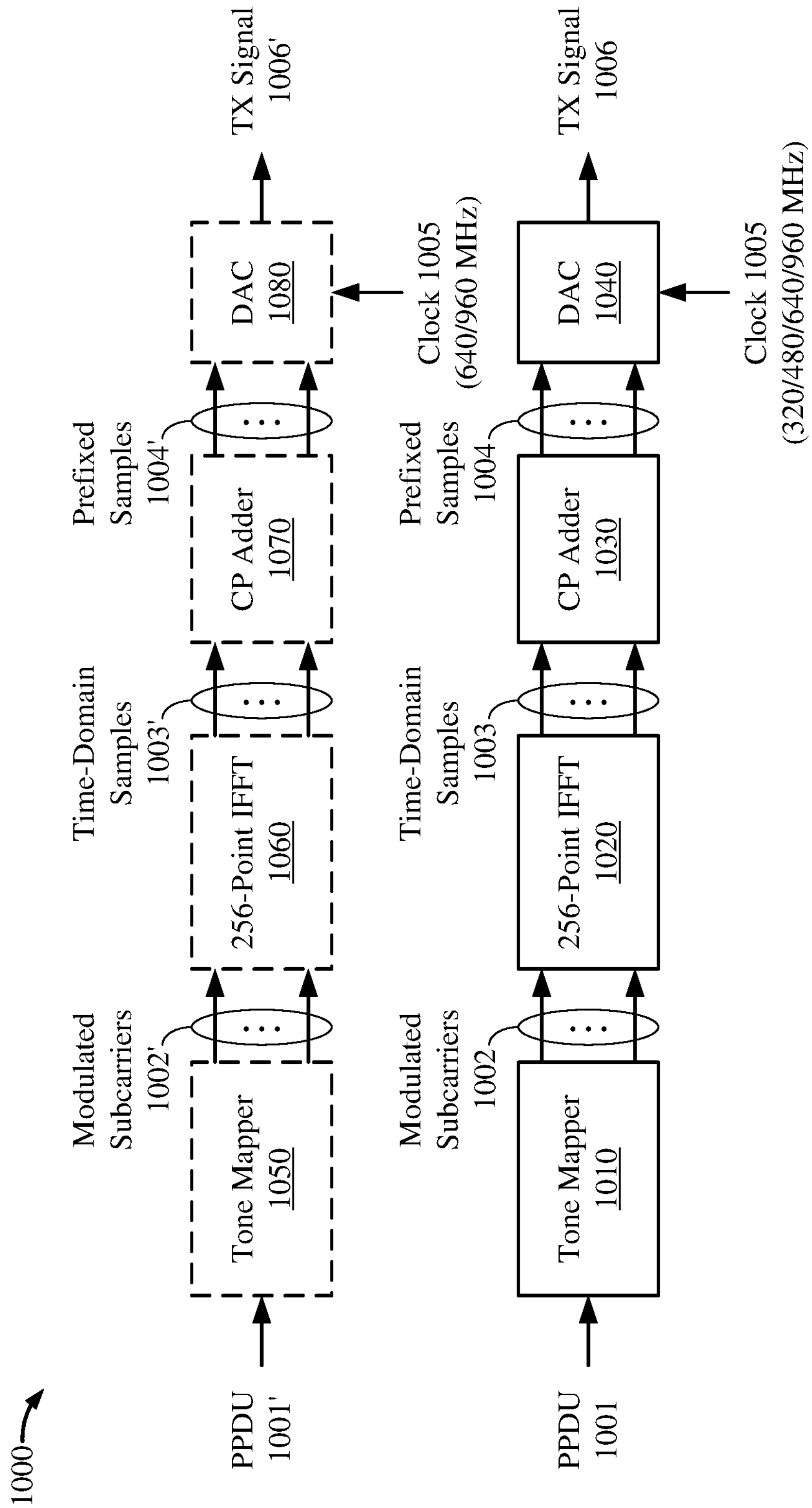
FIG. 10 shows another block diagram of an example OFDM up-clocking system, according to some implementations.

FIG. 10 shows another block diagram of an example OFDM up-clocking system 1000, according to some implementations. In some aspects, the OFDM up-clocking system 1000 may be configured to up-clock a PPDU 1001 to a TX signal 1006 suitable for transmission on carrier frequencies above 7 GHz (such as in the 60 GHz or 45 GHz frequency bands). More specifically, the OFDM up-clocking system 1000 may map the PPDU 1001 onto a set of orthogonal subcarriers associated with a 1×SCS greater than or equal to 1.2 MHz. In some implementations, the OFDM up-clocking system 1000 may be one example of the OFDM modulator 620 of FIG. 6. With reference for example to FIG. 6, the PPDU 1001 and the TX signal 1006 may be examples of the FD symbols 602 and the TX signal 603, respectively.

The OFDM up-clocking system 1000 includes a tone mapper 1010, a 256-point IFFT 1020, a CP adder 1030, and a DAC 1040. In the example of FIG. 10, the tone mapper 1010 is configured to map the PPDU 1001 to 256 subcarriers associated with a given bandwidth to produce 256 modulated subcarriers 1002. In some implementations, the PPDU 1001 may conform to an 11ac PPDU format associated with an 80 MHz channel bandwidth. In such implementations, the 256 subcarriers may include 234 data subcarriers, 8 pilot subcarriers, 11 guard subcarriers, and 3 DC subcarriers. In some other implementations, the PPDU 1001 may conform to an 11be PPDU format associated with a 20 MHz channel bandwidth. In such implementations, the 256 subcarriers may include 234 data subcarriers, 8 pilot subcarriers, 11 guard subcarriers, and 3 DC subcarriers. The 256-point IFFT 1020 transforms the 256 modulated subcarriers 1002, from the frequency domain to the time domain, as 256 time-domain samples 1003. The CP adder 1030 adds a cyclic prefix to the time-domain samples 1003 to produce a number of prefixed samples 1004.

The DAC 1040 converts the prefixed samples 1004 to the TX signal 1006 based on a clock signal 1005. As described with reference to FIG. 7, the SCS associated with the TX signal 1006 depends on the sampling rate $f_s$ of the DAC 1040 (which is controlled by the frequency of the clock signal 1005) and the size $N_{IFFT}$ of the IFFT 1020, where $$SCS = \frac{f_s}{N_{IFFT}}.$$

In some aspects, the clock signal 1005 may be up-clocked to a frequency higher than 80 MHz (such as when the PPDU 1001 conforms to the 11ac PPDU format associated with an 80 MHz channel bandwidth) or higher than 20 MHz (such as when the PPDU 1001 conforms to the 11be PPDU format associated with a 20 MHz channel bandwidth). More specifically, the frequency of the clock signal 1005 may be configured to ensure that the 1×SCS associated with the TX signal 1006 is greater than or equal to 1.2 MHz.

In some implementations, the clock signal 1005 may be up-clocked to 320 MHz, which results in a 1×SCS equal to 1.25 MHz. In some other implementations, the clock signal may be up-clocked to 480 MHz, which results in a 1×SCS equal to 1.875 MHz. Table 3 summarizes example parameters for up-clocking a PPDU 1001 conforming to an 11ac PPDU format associated with an 80 MHz channel bandwidth. Table 4 summarizes example parameters for up-clocking a PPDU 1001 conforming to an 11be PPDU format associated with a 20 MHz channel bandwidth.

TABLE 3

| | Baseline 11ac PPDU Format for 80 MHz Channel Bandwidth | |
|---|---|---|
| Bandwidth | 320 MHz | 480 MHz |
| Up-clocking | 4x | 6x |
| IFFT Size | 256 | 256 |
| # Data Subcarriers | 234 | 234 |
| # Pilot Subcarriers | 8 | 8 |
| # Guard/DC Subcarriers | 11/3 | 11/3 |
| Subcarrier Spacing | 1.25 MHz | 1.875 MHz |
| Symbol Duration | 800 ns | 533.3 ns |
| Cyclic Prefix Duration | 200 ns (long)<br>100 ns (short) | 133.3 ns (long)<br>66.7 ns (short) |
| Data Rate with 16QAM ¾ | 0.78 Gbps | 1.17 Gbps |

TABLE 4

| | Baseline 11be PPDU Format for 20 MHz Channel Bandwidth | |
|---|---|---|
| Bandwidth | 320 MHz | 480 MHz |
| Up-clocking | 16x | 24x |
| IFFT Size | 256 | 256 |
| # Data Subcarriers | 234 | 234 |
| # Pilot Subcarriers | 8 | 8 |
| # Guard/DC Subcarriers | 11/3 | 11/3 |
| Subcarrier Spacing | 1.25 MHz | 1.875 MHz |
| Symbol Duration | 800 ns | 533.3 ns |
| Cyclic Prefix Duration | 200 ns (long)<br>100 ns (short) | 133.3 ns (long)<br>66.7 ns (short) |
| Data Rate with 16QAM ¾ | 0.78 Gbps | 1.17 Gbps |

Aspects of the present disclosure recognize that some existing versions of the IEEE 802.11 standard support channel bonding, whereby a PPDU can be transmitted concurrently over multiple channels to achieve gains similar to a wider bandwidth channel. For example, the IEEE 802.11ac amendment of the IEEE 802.11 standards defines a PPDU format that can be transmitted concurrently on two 80 MHz channels (also referred to as an 80+80 channel bandwidth) to achieve gains similar to a 160 MHz channel.

In some aspects, the OFDM up-clocking system 1000 may leverage existing channel bonding hardware to transmit PPDUs having wider bandwidths (without additional up-clocking). In such aspects, the PPDU 1001 may represent a first PPDU segment configured to be transmitted over a first wireless channel. The OFDM up-clocking system 1000 may further receive a second PPDU segment 1001' configured to be transmitted over a second wireless channel, where the PPDU segments 1001 and 1001' collectively form a single PPDU. In some implementations, the PPDU may conform to an 11ac PPDU format associated with an 80+80 MHz channel bandwidth.

In some implementations, the OFDM up-clocking system 1000 may include an additional tone mapper 1050, an additional 256-point IFFT 1060, an additional CP adder 1070, and an additional DAC 1080. The tone mapper 1050 is configured to map the second PPDU segment 1001' to 256 subcarriers associated with an 80 MHz bandwidth to produce 256 modulated subcarriers 1002'. More specifically, the 256 subcarriers may include 234 data subcarriers, 8 pilot subcarriers, 11 guard subcarriers, and 3 DC subcarriers. The 256-point IFFT 1060 transforms the 256 modulated subcarriers 1002', from the frequency domain to the time domain, as 256 time-domain samples 1003'. The CP adder 1070 adds a cyclic prefix to the time-domain samples 1003 to produce a number of prefixed samples 1004 (such as described with reference to FIG. 7). The DAC 1080 converts the prefixed samples 1004' to a TX signal 1006' based on the clock signal 1005. Table 5 summarizes example parameters for up-clocking a PPDU conforming to an 11ac PPDU format associated with an 80+80 MHz channel bandwidth.

TABLE 5

| | Baseline 11ac PPDU Format for 80 + 80 MHz Channel Bandwidth | |
|---|---|---|
| Bandwidth | 640 MHz | 960 MHz |
| Up-clocking | 4x | 6x |
| IFFT Size | 256 * 2 | 256 * 2 |
| # Data Subcarriers | 234 * 2 | 234 * 2 |
| # Pilot Subcarriers | 8 * 2 | 8 * 2 |
| # Guard/DC Subcarriers | 11/11 | 11/11 |
| Subcarrier Spacing | 1.25 MHz | 1.875 MHz |
| Symbol Duration | 800 ns | 533.3 ns |
| Cyclic Prefix Duration | 200 ns (long)<br>100 ns (short) | 133.3 ns (long)<br>66.7 ns (short) |
| Data Rate with 16QAM ¾ | 1.56 Gbps | 2.34 Gbps |

Figure 11A:
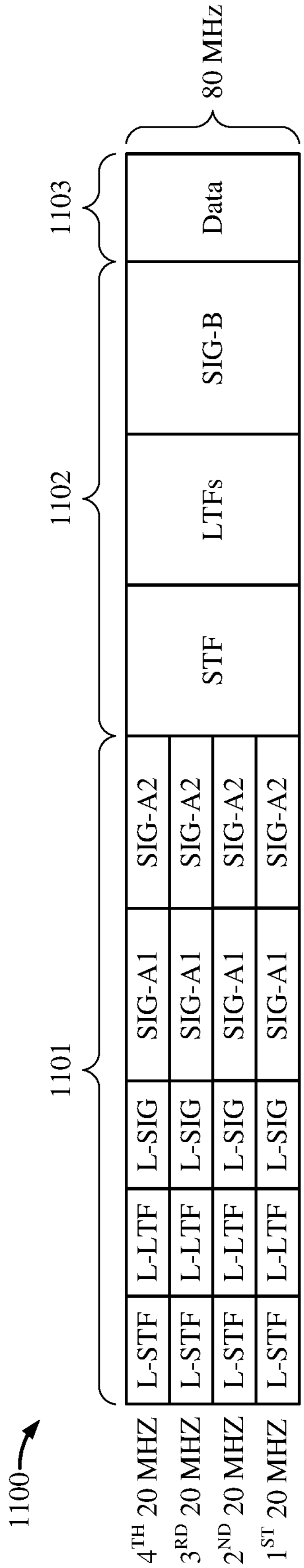
FIG. 11A shows an example PPDU formatted in accordance with a legacy PPDU format.

FIG. 11A shows an example PPDU 1100 formatted in accordance with a legacy PPDU format. In the example of FIG. 11A, the legacy PPDU format is an 11ac PPDU format associated with an 80 MHz channel bandwidth. The PPDU 1100 includes a PHY preamble, having a first portion 1101 and a second portion 1102, followed by a data portion 1103. The first preamble portion 1101 includes an L-STF, an L-LTF, an L-SIG, a first non-legacy signal field (SIG-A) spanning a first symbol (SIG-A1) and a second symbol (SIG-A2). The second preamble portion 1102 includes a non-legacy short training field (STF), one or more non-legacy long training fields (LTFs), and a second non-legacy signal field (SIG-B).

The IEEE 802.11ac amendment of the IEEE 802.11 standard defines the non-legacy fields SIG-A1, SIG-A2, STF, LTFs, and SIG-B as VHT fields VHT-SIG-A1, VHT-SIG-A2, VHT-STF, VHT-LTFs, and VHT-SIG-B, respectively. In some implementations, one or more of the non-legacy fields may be repurposed to carry signaling or other information specific to wireless communications on carrier frequencies above 7 GHz (such as in the 60 GHz or 45 GHz frequency bands). As shown in FIG. 11A, the first preamble portion 1101 is duplicated on four 20 MHz sub-bands spanning the 80 MHz bandwidth. According to the 11ac PPDU format, the first preamble portion 1101, the second preamble portion 1102, and the data portion 1102 are mapped to the same subcarriers.

Figure 11B:
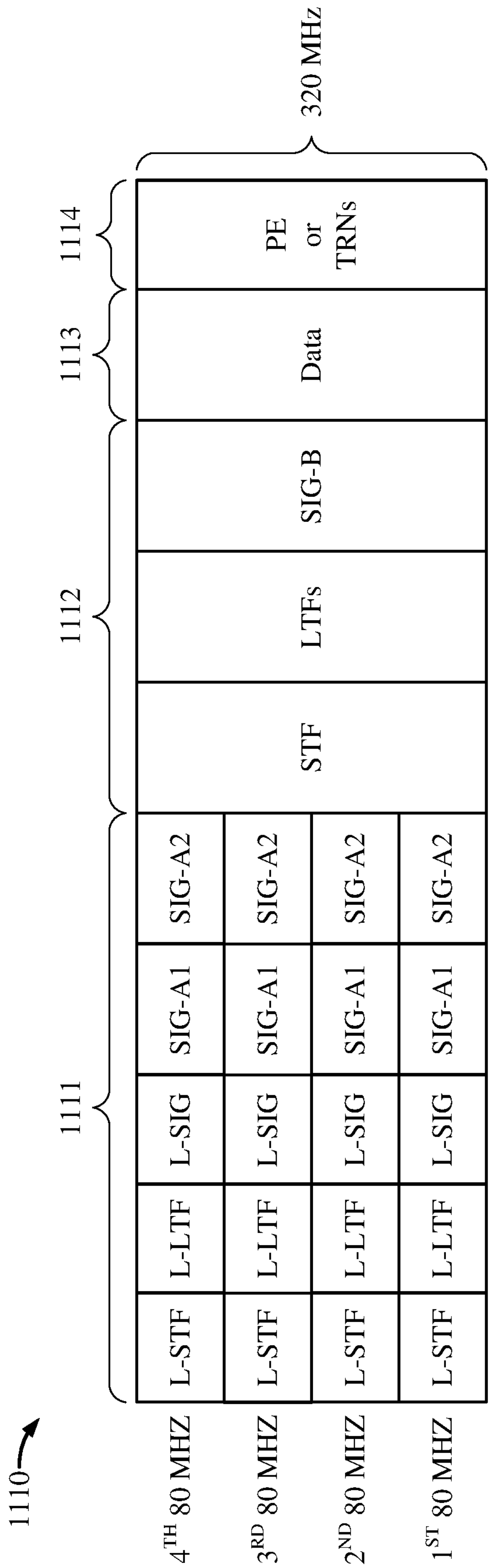
FIG. 11B shows an example up-clocked PPDU based on the PPDU format depicted in FIG. 11A, according to some implementations.

FIG. 11B shows an example up-clocked PPDU 1110 based on the PPDU format depicted in FIG. 11A, according to some implementations. The PPDU 1110 includes a PHY preamble, having a first portion 1111 and a second portion 1112, followed by a data portion 1113. In some implementations, a PE or TRN field 1114 may be added to the PPDU 1111 to support enhanced features for wireless communications on carrier frequencies above 7 GHz. In some aspects, the PPDU 1110 may represent an up-clocking of the PPDU 1100 by a factor of 4. As such, the first preamble portion 1111, the second preamble portion 1112, and the data portion 1113 may be examples of the first preamble portion 1101, the second preamble portion 1102, and the data portion 1103, respectively, of FIG. 11A. In some aspects, the up-clocking may be performed by the OFDM up-clocking system 1000 of FIG. 10. As a result of up-clocking the PPDU 1100 by a factor of 4, the data portion 1113 is spread over a 320 MHz bandwidth and the first preamble portion 1111 is duplicated on four 80 MHz sub-bands spanning the 320 MHz bandwidth.

In some implementations, the PPDU 1110 may be duplicated a number (K) of times in the frequency domain to achieve a wider channel bandwidth (such as through channel bonding). For example, the PPDU 1110 can be duplicated on four, six, or eight 320 MHz channels to achieve channel bandwidths equal to 1.28 GHz, 1.92 GHz, or 2.56 GHz, respectively. Table 6 summarizes example parameters for duplicating the PPDU 1110 in the frequency domain (FD DUP) to achieve wider channel bandwidths.

TABLE 6

| | Baseline 320 MHz PPDU with 1.25 MHz SCS | | |
|---|---|---|---|
| Bandwidth | 1.28 GHz | 1.92 GHz | 2.56 GHz |
| FD DUP | 4x | 6x | 8x |
| IFFT Size | 256 * 4 | 256 * 6 | 256 * 8 |
| # Data Subcarriers | 234 * 4 | 234 * 6 | 234 * 8 |
| # Pilot Subcarriers | 8 * 4 | 8 * 6 | 8 * 8 |
| # Guard/DC Subcarriers | 11/11 | 11/11 | 11/11 |
| Subcarrier Spacing | 1.25 MHz | 1.25 MHz | 1.25 MHz |
| Symbol Duration | 800 ns | 800 ns | 800 ns |
| Cyclic Prefix Duration | 200 ns (long)<br>100 ns (short)<br>50 ns | 200 ns (long)<br>100 ns (short)<br>50 ns | 200 ns (long)<br>100 ns (short)<br>50 ns |
| Data Rate with 16QAM ¾ | 3.3 Gbps | 4.96 Gbps | 6.6 Gbps |

In some other implementations, the PPDU 1110 may be further up-clocked by a factor of K to achieve a wider channel bandwidth (without channel bonding). For example, the PPDU 1110 can be further up-clocked by a factor of four, six, or eight to achieve channel bandwidths equal to 1.28 GHz, 1.92 GHz, or 2.56 GHz, respectively. Table 7 summarizes example parameters for up-clocking the PPDU 1110 to achieve wider channel bandwidths.

TABLE 7

| | Baseline 320 MHz PPDU with 1.25 MHz SCS | | |
|---|---|---|---|
| Bandwidth | 1.28 GHz | 1.92 GHz | 2.56 GHz |
| Up-clocking | 4x | 6x | 8x |
| IFFT Size | 256 | 256 | 256 |
| # Data Subcarriers | 234 | 234 | 234 |
| # Pilot Subcarriers | 8 | 8 | 8 |
| # Guard/DC Subcarriers | 11/3 | 11/3 | 11/3 |
| Subcarrier Spacing | 5 MHz | 7.5 MHz | 10 MHz |
| Symbol Duration | 200 ns | 133.33 ns | 100 ns |
| Cyclic Prefix Duration | 50 ns (long)<br>25 ns (short)<br>12.5 ns | 33.33 ns (long)<br>16.67 ns (short) | 25 ns (long)<br>12.5 ns (short) |
| Data Rate with 16QAM ¾ | 3.12 Gbps | | |

Figure 11C:
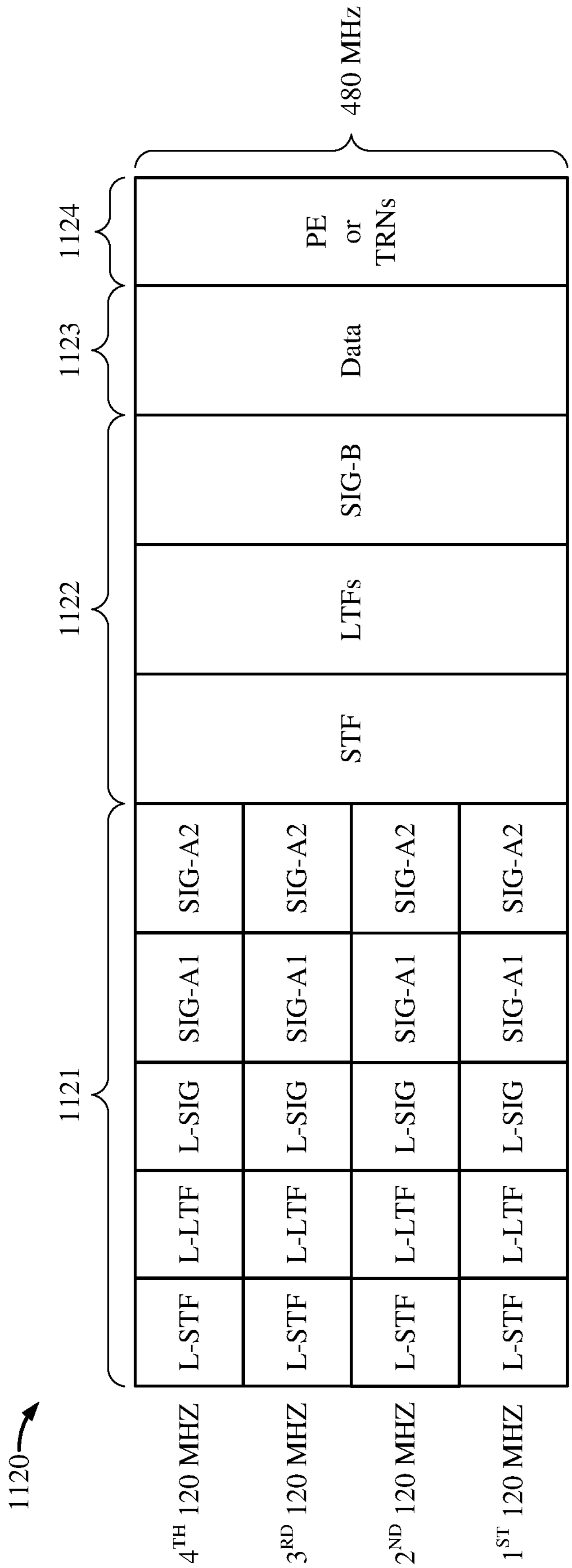
FIG. 11C shows another example up-clocked PPDU based on the PPDU format depicted in FIG. 11A, according to some implementations.

FIG. 11C shows another example up-clocked PPDU 1120 based on the PPDU format depicted in FIG. 11A, according to some implementations. The PPDU 1120 includes a PHY preamble, having a first portion 1121 and a second portion 1122, followed by a data portion 1123. In some implementations, a PE or TRN field 1124 may be added to the PPDU 1121 to support enhanced features for wireless communications on carrier frequencies above 7 GHz. In some aspects, the PPDU 1120 may represent an up-clocking of the PPDU 1100 by a factor of 6. As such, the first preamble portion 1121, the second preamble portion 1122, and the data portion 1123 may be examples of the first preamble portion 1101, the second preamble portion 1102, and the data portion 1103, respectively, of FIG. 11A. In some aspects, the up-clocking may be performed by the OFDM up-clocking system 1000 of FIG. 10. As a result of up-clocking the PPDU 1100 by a factor of 6, the data portion 1123 is spread over a 480 MHz bandwidth and the first preamble portion 1121 is duplicated on four 120 MHz sub-bands spanning the 480 MHz bandwidth.

Figure 12A:
FIG. 12A shows another example PPDU formatted in accordance with a legacy PPDU format.

FIG. 12A shows another example PPDU 1200 formatted in accordance with a legacy PPDU format. In the example of FIG. 12A, the legacy PPDU format is an 11be PPDU format associated with a 20 MHz channel bandwidth. The PPDU 1200 includes a PHY preamble, having a first portion 1201 and a second portion 1202, followed by a data portion 1203 and a PE 1204. The first preamble portion 1201 includes an L-STF, an L-LTF, an L-SIG, RL-SIG, a first non-legacy signal field (SIG1), and a second non-legacy signal field (SIG2). The second preamble portion 1202 includes a non-legacy short training field (STF) and one or more non-legacy long training fields (LTFs).

The IEEE 802.11be amendment of the IEEE 802.11 standard defines the first non-legacy signal field SIG1 as a U-SIG and defines the remaining non-legacy fields SIG2, STF, and LTFs as EHT fields EHT-SIG, EHT-STF, and EHT-LTFs, respectively. In some implementations, one or more of the non-legacy fields may be repurposed to carry signaling or other information specific to wireless communications on carrier frequencies above 7 GHz (such as in the 60 GHz or 45 GHz frequency bands). According to the 11be PPDU format, the data portion 1203 (and the second preamble portion 1202) is mapped to each contiguous data subcarrier associated with a 256-subcarrier tone plan. In contrast, L-STF is mapped to every 4th data subcarrier associated with a 64-subcarrier tone plan while the remainder of the first preamble portion 1201 is mapped to each contiguous data subcarrier associated with the 64-subcarrier tone plan. As such, the SCS associated with L-STF is 4×larger than the SCS associated with the data portion 1203.

Figure 12B:
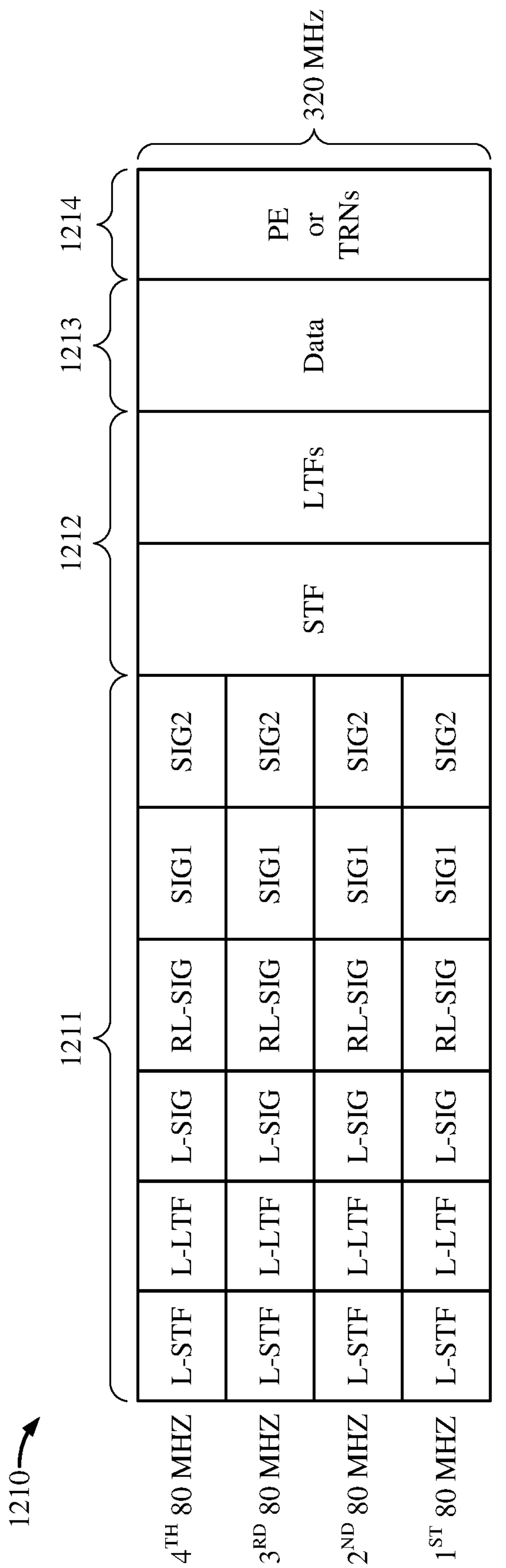
FIG. 12B shows an example up-clocked PPDU based on the PPDU format depicted in FIG. 12A, according to some implementations.

FIG. 12B shows an example up-clocked PPDU 1210 based on the PPDU format depicted in FIG. 12A, according to some implementations. The PPDU 1210 includes a PHY preamble, having a first portion 1211 and a second portion 1212, followed by a data portion 1213 and a PE or TRN field 1214. In some implementations, the PPDU 1210 may represent an up-clocking of the PPDU 1200 by a factor of 16. As such, the first preamble portion 1211, the second preamble portion 1212, the data portion 1213, and the PE or TRN field 1214 may be examples of the first preamble portion 1201, the second preamble portion 1202, the data portion 1203, and the PE 1204, respectively, of FIG. 12A.

In some implementations, the up-clocking may be performed by the OFDM up-clocking system 1000 of FIG. 10. As described with reference to FIG. 12A, the SCS associated with L-STF is 4× larger than the SCS associated with the data portion 1203. Thus, the first preamble portion 1201 can be up-clocked by a factor of 4, and duplicated 4× in the frequency domain, to achieve the same SCS in L-STF as in the data portion 1213. In some implementations, the up-clocking system 1000 may up-clock the first preamble portion 1201 by a factor of 4 and may up-clock the remainder of the PPDU 1200 by a factor of 16 so that the data portion 1213 is spread over a 320 MHz bandwidth and the first preamble portion 1211 is duplicated on four 80 MHz sub-bands spanning the 320 MHz bandwidth.

In some implementations, the PPDU 1210 may be duplicated a number (K) of times in the frequency domain to achieve a wider channel bandwidth (such as through channel bonding). For example, the PPDU 1210 can be duplicated on four, six, or eight 320 MHz channels to achieve channel bandwidths equal to 1.28 GHz, 1.92 GHz, or 2.56 GHz, respectively. Table 6 provides a detailed summary of example parameters for duplicating the PPDU 1210 in the frequency domain to achieve wider channel bandwidths. In some other implementations, the PPDU 1210 may be further up-clocked by a factor of K to achieve a wider channel bandwidth (without channel bonding). For example, the PPDU 1210 can be further up-clocked by a factor of four, six, or eight to achieve channel bandwidths equal to 1.28 GHz, 1.92 GHz, or 2.56 GHz, respectively. Table 7 provides a detailed summary of example parameters for up-clocking the PPDU 1210 to achieve wider channel bandwidths.

Figure 12C:
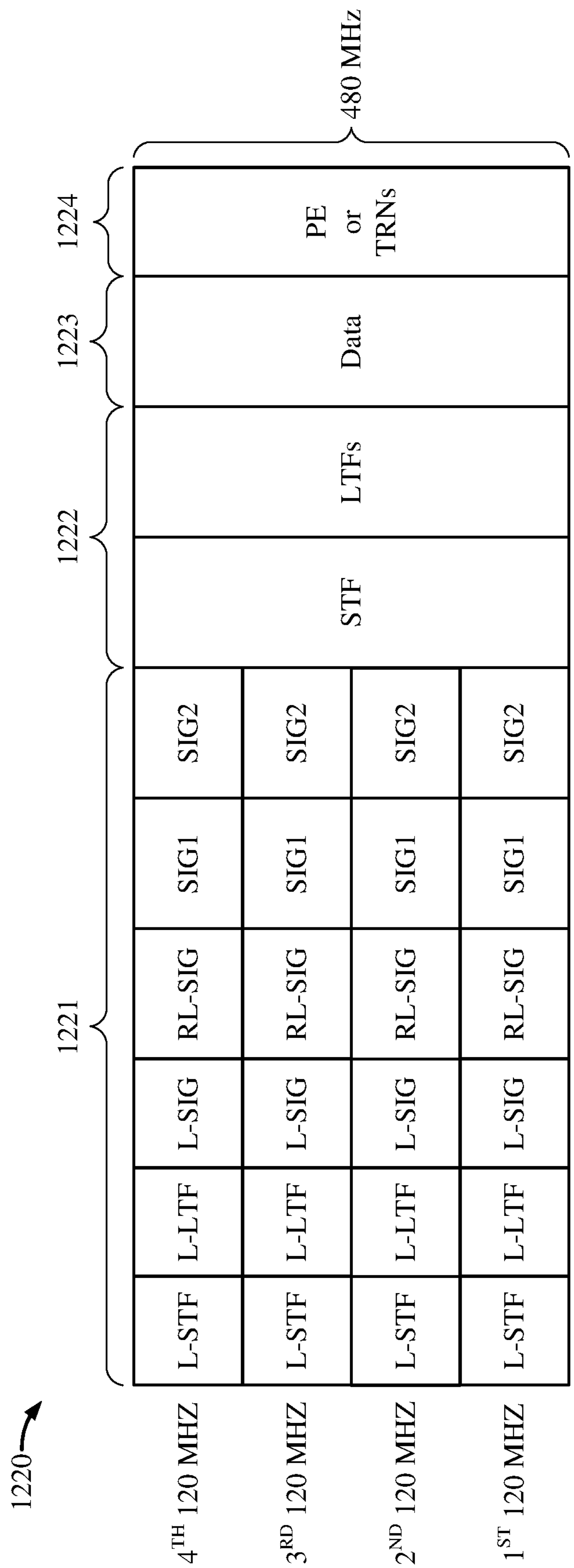
FIG. 12C shows another example up-clocked PPDU based on the PPDU format depicted in FIG. 12A, according to some implementations.

FIG. 12C shows another example up-clocked PPDU 1220 based on the PPDU format depicted in FIG. 12A, according to some implementations. The PPDU 1220 includes a PHY preamble, having a first portion 1221 and a second portion 1222, followed by a data portion 1223 and a PE or TRN field 1224. In some implementations, the PPDU 1220 may represent an up-clocking of the PPDU 1200 by a factor of 24. As such, the first preamble portion 1221, the second preamble portion 1222, the data portion 1223, and the PE or TRN field 1224 may be examples of the first preamble portion 1201, the second preamble portion 1202, the data portion 1203, and the PE 1204, respectively, of FIG. 12A.

In some implementations, the up-clocking may be performed by the OFDM up-clocking system 1000 of FIG. 10. As described with reference to FIG. 12A, the SCS associated with L-STF is 4× larger than the SCS associated with the data portion 1203. Thus, the first preamble portion 1201 can be up-clocked by a factor of 6, and duplicated 4× in the frequency domain, to achieve the same SCS in L-STF as in the data portion 1213. In some implementations, the OFDM up-clocking system 1000 may up-clock the first preamble portion 1201 by a factor of 6 and may up-clock the remainder of the PPDU 1200 by a factor of 24 so that the data portion 1223 is spread over a 480 MHz bandwidth and the first preamble portion 1221 is duplicated on four 120 MHz sub-bands spanning the 320 MHz bandwidth.

Figure 13A:
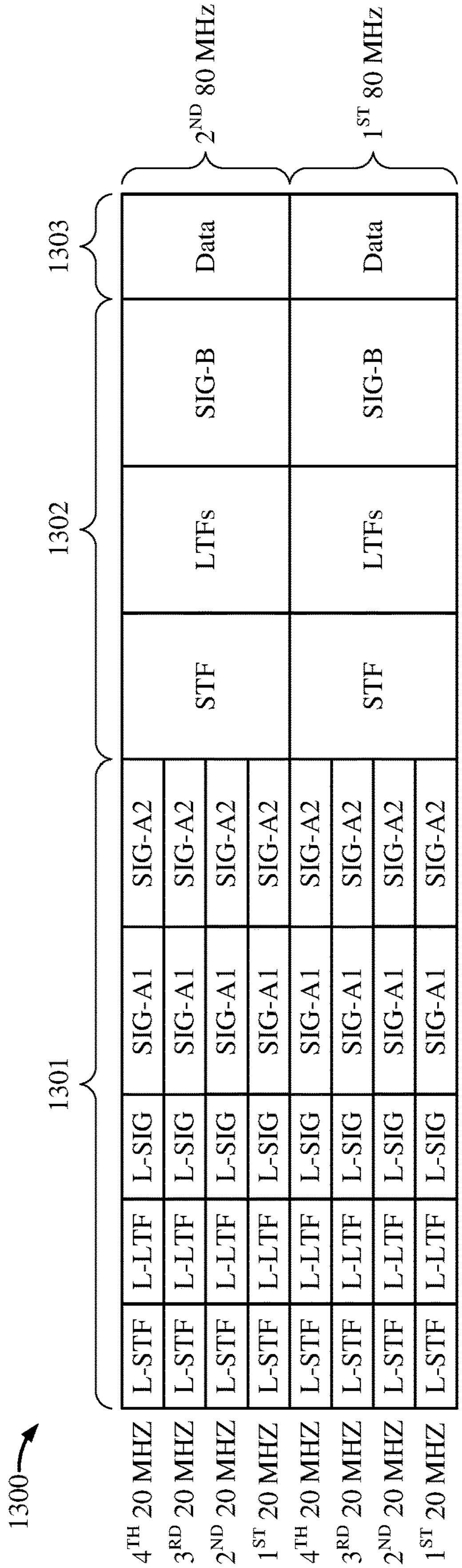
FIG. 13A shows another example PPDU formatted in accordance with a legacy PPDU format.

FIG. 13A shows another example PPDU 1300 formatted in accordance with a legacy PPDU format. In the example of FIG. 13A, the legacy PPDU format is an 11ac PPDU format associated with an 80+80 MHz channel bandwidth. The PPDU 1300 includes a PHY preamble, having a first portion 1301 and a second portion 1302, followed by a data portion 1303. The first preamble portion 1301 includes an L-STF, an L-LTF, an L-SIG, a first non-legacy signal field (SIG-A) spanning a first symbol (SIG-A1) and a second symbol (SIG-A2). The second preamble portion 1302 includes a non-legacy short training field (STF), one or more non-legacy long training fields (LTFs), and a second non-legacy signal field (SIG-B).

The IEEE 802.11ac amendment of the IEEE 802.11 standard defines the non-legacy fields SIG-A1, SIG-A2, STF, LTFs, and SIG-B as VHT fields VHT-SIG-A1, VHT-SIG-A2, VHT-STF, VHT-LTFs, and VHT-SIG-B, respectively. In some implementations, one or more of the non-legacy fields may be repurposed to carry signaling or other information specific to wireless communications on carrier frequencies above 7 GHz (such as in the 60 GHz or 45 GHz frequency bands). As shown in FIG. 13A, the first preamble portion 1301 is duplicated on four 20 MHz sub-bands spanning the first 80 MHz channel and another four 20 MHz sub-bands spanning the second 80 MHz channel. According to the 11ac PPDU format, the first preamble portion 1301, the second preamble portion 1302, and the data portion 1302 are mapped to the same subcarriers.

Figure 13B:
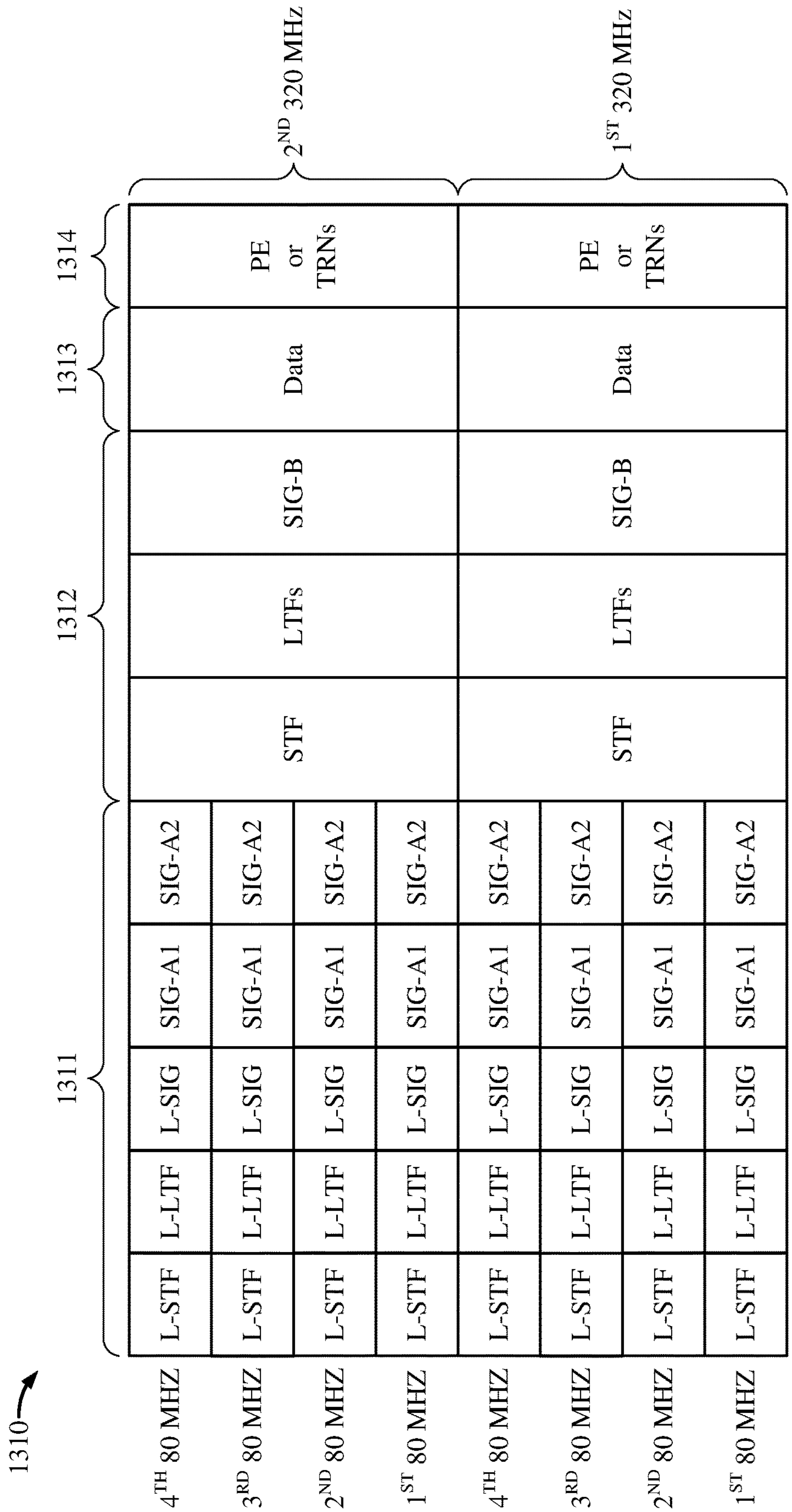
FIG. 13B shows an up-clocked PPDU based on the PPDU format depicted in FIG. 13A, according to some implementations.

FIG. 13B shows an up-clocked PPDU 1310 based on the PPDU format depicted in FIG. 13A, according to some implementations. The PPDU 1310 includes a PHY preamble, having a first portion 1311 and a second portion 1312, followed by a data portion 1313. In some implementations, a PE or TRN field 1314 may be added to the PPDU 1311 to support enhanced features for wireless communications on carrier frequencies above 7 GHz. In some aspects, the PPDU 1310 may represent an up-clocking of the PPDU 1300 by a factor of 4. As such, the first preamble portion 1311, the second preamble portion 1312, and the data portion 1313 may be examples of the first preamble portion 1301, the second preamble portion 1302, and the data portion 1303, respectively, of FIG. 13A. In some aspects, the up-clocking may be performed by the OFDM up-clocking system 1000 of FIG. 10. As a result of up-clocking the PPDU 1300 by a factor of 4, the data portion 1313 is spread over two 320 MHz channels (for a total bandwidth equal to 640 MHz), and the first preamble portion 1311 is duplicated on four 80 MHz sub-bands spanning the first 320 MHz channel and another four 80 MHz sub-bands spanning the second 320 MHz channel.

Figure 13C:
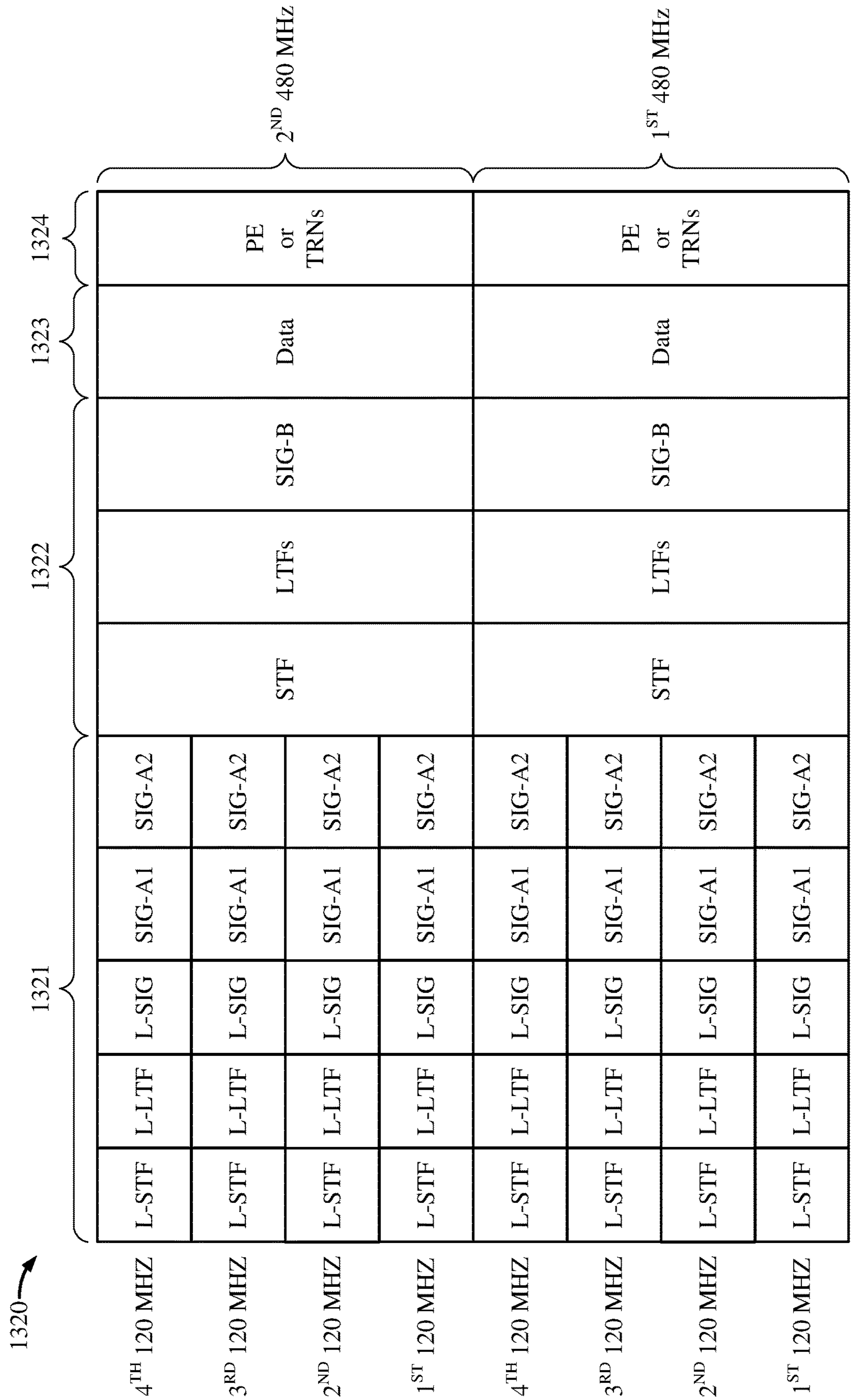
FIG. 13C shows another example up-clocked PPDU based on the PPDU format depicted in FIG. 13A, according to some implementations.

FIG. 13C shows another example up-clocked PPDU 1320 based on the PPDU format depicted in FIG. 13A, according to some implementations. The PPDU 1320 includes a PHY preamble, having a first portion 1321 and a second portion 1322, followed by a data portion 1323. In some implementations, a PE or TRN field 1324 may be added to the PPDU 1321 to support enhanced features for wireless communications on carrier frequencies above 7 GHz. In some aspects, the PPDU 1320 may represent an up-clocking of the PPDU 1300 by a factor of 6. As such, the first preamble portion 1321, the second preamble portion 1322, and the data portion 1323 may be examples of the first preamble portion 1301, the second preamble portion 1302, and the data portion 1303, respectively, of FIG. 13A. In some aspects, the up-clocking may be performed by the OFDM up-clocking system 1000 of FIG. 10. As a result of up-clocking the PPDU 1300 by a factor of 6, the data portion 1323 is spread over two 480 MHz channels (for a total bandwidth equal to 960 MHz), and the first preamble portion 1321 is duplicated on four 120 MHz sub-bands spanning the first 480 MHz channel and another four 120 MHz sub-bands spanning the second 480 MHz channel.

Figure 14:
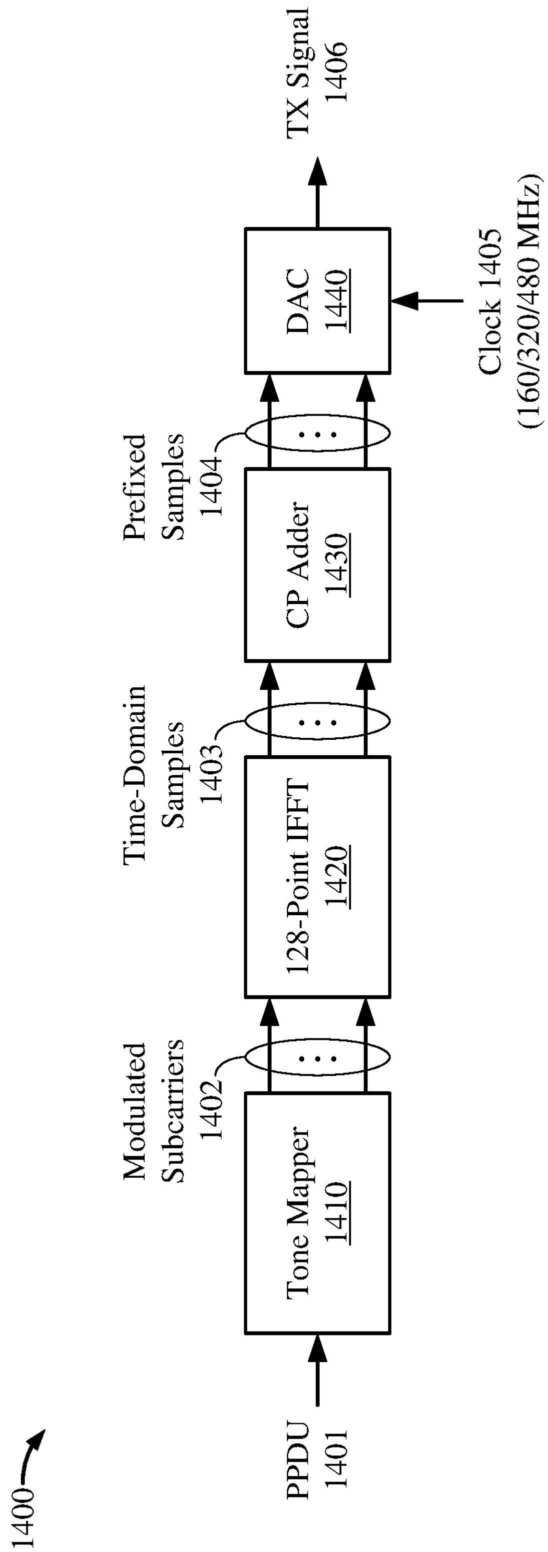
FIG. 14 shows another block diagram of an example OFDM up-clocking system, according to some implementations.

FIG. 14 shows another block diagram of an example OFDM up-clocking system 1400, according to some implementations. In some aspects, the OFDM up-clocking system 1400 may be configured to up-clock a PPDU 1401 to a TX signal 1406 suitable for transmission on carrier frequencies above 7 GHz (such as in the 60 GHz or 45 GHz frequency bands). More specifically, the OFDM up-clocking system 1400 may map the PPDU 1401 onto a set of orthogonal subcarriers associated with a 1×SCS greater than or equal to 1.2 MHz. In some implementations, the OFDM up-clocking system 1400 may be one example of the OFDM modulator 620 of FIG. 6. With reference for example to FIG. 6, the PPDU 1401 and the TX signal 1406 may be examples of the FD symbols 602 and the TX signal 603, respectively.

The OFDM up-clocking system 1400 includes a tone mapper 1410, a 128-point IFFT 1420, a CP adder 1430, and a DAC 1440. In the example of FIG. 14, the tone mapper 1410 is configured to map the PPDU 1401 to 128 subcarriers associated with a given bandwidth to produce 128 modulated subcarriers 1402. As described above, the PPDU 1401 may conform to an 11ac PPDU format associated with a 40 MHz channel bandwidth. As such, the 128 subcarriers may include 108 data subcarriers, 6 pilot subcarriers, 11 guard subcarriers, and 3 DC subcarriers. The 128-point IFFT 1420 transforms the 128 modulated subcarriers 1402, from the frequency domain to the time domain, as 128 time-domain samples 1403. The CP adder 1430 adds a cyclic prefix to the time-domain samples 1403 to produce a number of prefixed samples 1404.

The DAC 1440 converts the prefixed samples 1404 to the TX signal 1406 based on a clock signal 1405. As described with reference to FIG. 7, the SCS associated with the TX signal 1406 depends on the sampling rate $f_s$ of the DAC 1440 (which is controlled by the frequency of the clock signal 1405) and the size $N_{IFFT}$ of the IFFT 1420, where $$SCS = \frac{f_s}{N_{IFFT}}.$$

In some aspects, the clock signal 1405 may be up-clocked to a frequency higher than 40 MHz. More specifically, the frequency of the clock signal 1405 may be configured to ensure that the 1×SCS associated with the TX signal 1406 is greater than or equal to 1.2 MHz.

In some implementations, the clock signal 1405 may be up-clocked to 160 MHz, which results in a 1×SCS equal to 1.25 MHz. In some other implementations, the clock signal may be up-clocked to 320 MHz, which results in a 1×SCS equal to 2.5 MHz. Still further, in some implementations, the clock signal 1405 may be up-clocked to 480 MHz, which results in a 1×SCS equal to 3.75 MHz. Table 8 summarizes example parameters for up-clocking a PPDU 1401 conforming to an 11ac PPDU format associated with an 80 MHz channel bandwidth.

TABLE 8

| | Baseline 11ac PPDU Format for 40 MHz Channel Bandwidth | | |
|---|---|---|---|
| Bandwidth | 160 MHz | 320 MHz | 480 MHz |
| Up-clocking | 4x | 8x | 6x |
| IFFT Size | 128 | 128 | 128 |
| # Data Subcarriers | 108 | 108 | 108 |
| # Pilot Subcarriers | 6 | 6 | 6 |
| # Guard/DC Subcarriers | 11/3 | 11/3 | 11/3 |
| Subcarrier Spacing | 1.25 MHz | 2.5 MHz | 3.75 MHz |
| Symbol Duration | 800 ns | 400 ns | 266.7 ns |
| Cyclic Prefix Duration | 200 ns (long) 100 ns (short) | 100 ns (long) 50 ns (short) | 66.7 ns (long) 33.3 ns (short) |
| Data Rate with 16QAM ¾ | 360 Mbps | 0.72 Gbps | 1.08 Gbps |

Figure 15A:
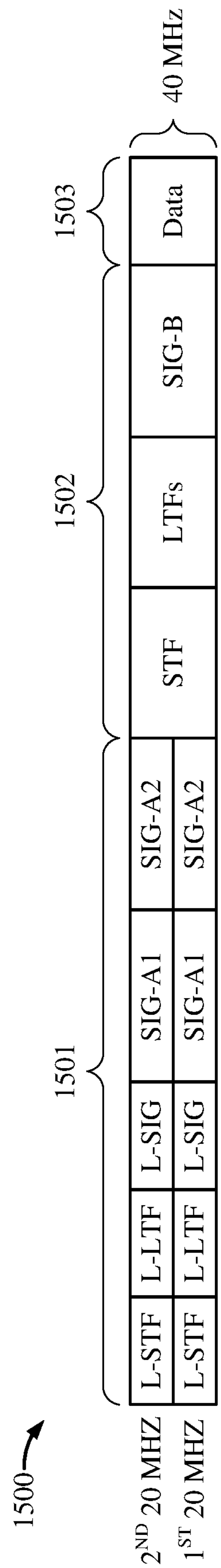
FIG. 15A shows an example PPDU formatted in accordance with a legacy PPDU format.

FIG. 15A shows an example PPDU 1500 formatted in accordance with a legacy PPDU format. In the example of FIG. 15A, the legacy PPDU format is an 11ac PPDU format associated with a 40 MHz channel bandwidth. The PPDU 1500 includes a PHY preamble, having a first portion 1501 and a second portion 1502, followed by a data portion 1503. The first preamble portion 1501 includes an L-STF, an L-LTF, an L-SIG, a first non-legacy signal field (SIG-A) spanning a first symbol (SIG-A1) and a second symbol (SIG-A2). The second preamble portion 1502 includes a non-legacy short training field (STF), one or more non-legacy long training fields (LTFs), and a second non-legacy signal field (SIG-B).

The IEEE 802.11ac amendment of the IEEE 802.11 standard defines the non-legacy fields SIG-A1, SIG-A2, STF, LTFs, and SIG-B as VHT fields VHT-SIG-A1, VHT-SIG-A2, VHT-STF, VHT-LTFs, and VHT-SIG-B, respectively. In some implementations, one or more of the non-legacy fields may be repurposed to carry signaling or other information specific to wireless communications on carrier frequencies above 7 GHz (such as in the 60 GHz or 45 GHz frequency bands). As shown in FIG. 15A, the first preamble portion 1501 is duplicated on two 20 MHz sub-bands spanning the 40 MHz bandwidth. According to the 11ac PPDU format, the first preamble portion 1501, the second preamble portion 1502, and the data portion 1502 are mapped to the same subcarriers.

Figure 15B:
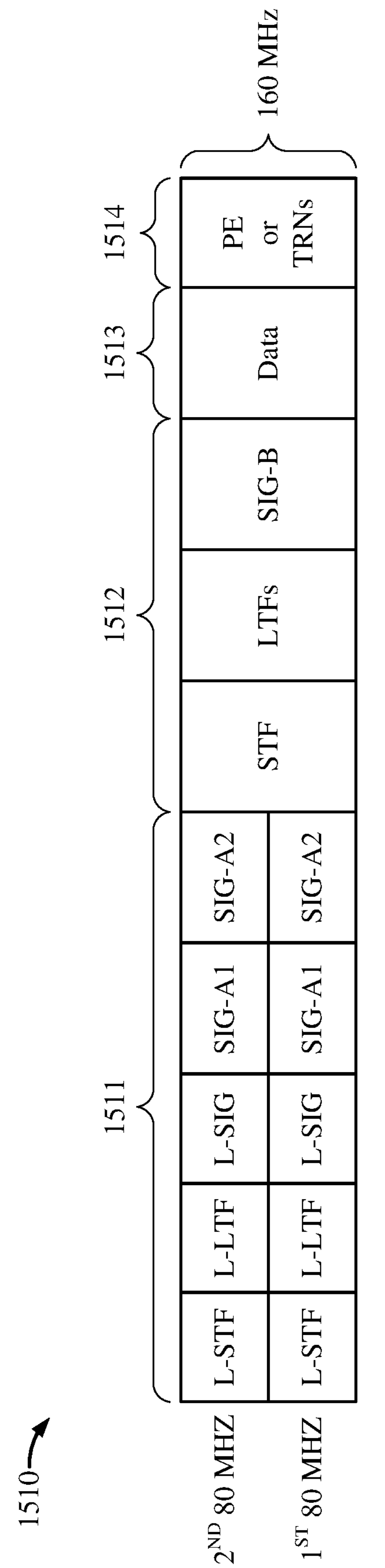
FIG. 15B shows an example up-clocked PPDU based on the PPDU format depicted in FIG. 15A, according to some implementations.

FIG. 15B shows an example up-clocked PPDU 1510 based on the PPDU format depicted in FIG. 15A, according to some implementations. The PPDU 1510 includes a PHY preamble, having a first portion 1511 and a second portion 1512, followed by a data portion 1513. In some implementations, a PE or TRN field 1514 may be added to the PPDU 1511 to support enhanced features for wireless communications on carrier frequencies above 7 GHz. In some aspects, the PPDU 1510 may represent an up-clocking of the PPDU 1500 by a factor of 4. As such, the first preamble portion 1511, the second preamble portion 1512, and the data portion 1513 may be examples of the first preamble portion 1501, the second preamble portion 1502, and the data portion 1503, respectively, of FIG. 15A. In some aspects, the up-clocking may be performed by the OFDM up-clocking system 1400 of FIG. 14. As a result of up-clocking the PPDU 1500 by a factor of 4, the data portion 1513 is spread over a 160 MHz bandwidth and the first preamble portion 1511 is duplicated on two 80 MHz sub-bands spanning the 160 MHz bandwidth.

Figure 15C:
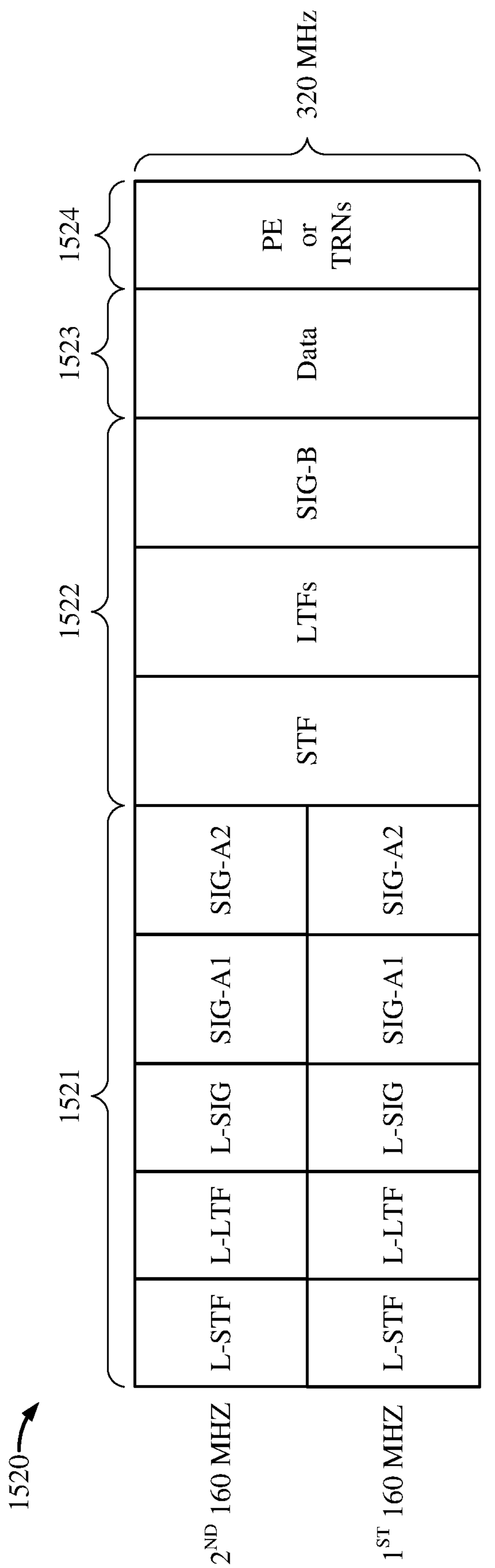
FIG. 15C shows another example up-clocked PPDU based on the PPDU format depicted in FIG. 15A, according to some implementations.

FIG. 15C shows another example up-clocked PPDU 1520 based on the PPDU format depicted in FIG. 15A, according to some implementations. The PPDU 1520 includes a PHY preamble, having a first portion 1521 and a second portion 1522, followed by a data portion 1523. In some implementations, a PE or TRN field 1524 may be added to the PPDU 1521 to support enhanced features for wireless communications on carrier frequencies above 7 GHz. In some aspects, the PPDU 1520 may represent an up-clocking of the PPDU 1500 by a factor of 8. As such, the first preamble portion 1521, the second preamble portion 1522, and the data portion 1523 may be examples of the first preamble portion 1501, the second preamble portion 1502, and the data portion 1503, respectively, of FIG. 15A. In some aspects, the up-clocking may be performed by the OFDM up-clocking system 1400 of FIG. 14. As a result of up-clocking the PPDU 1500 by a factor of 8, the data portion 1523 is spread over a 320 MHz bandwidth and the first preamble portion 1521 is duplicated on two 160 MHz sub-bands spanning the 320 MHz bandwidth.

Figure 15D:
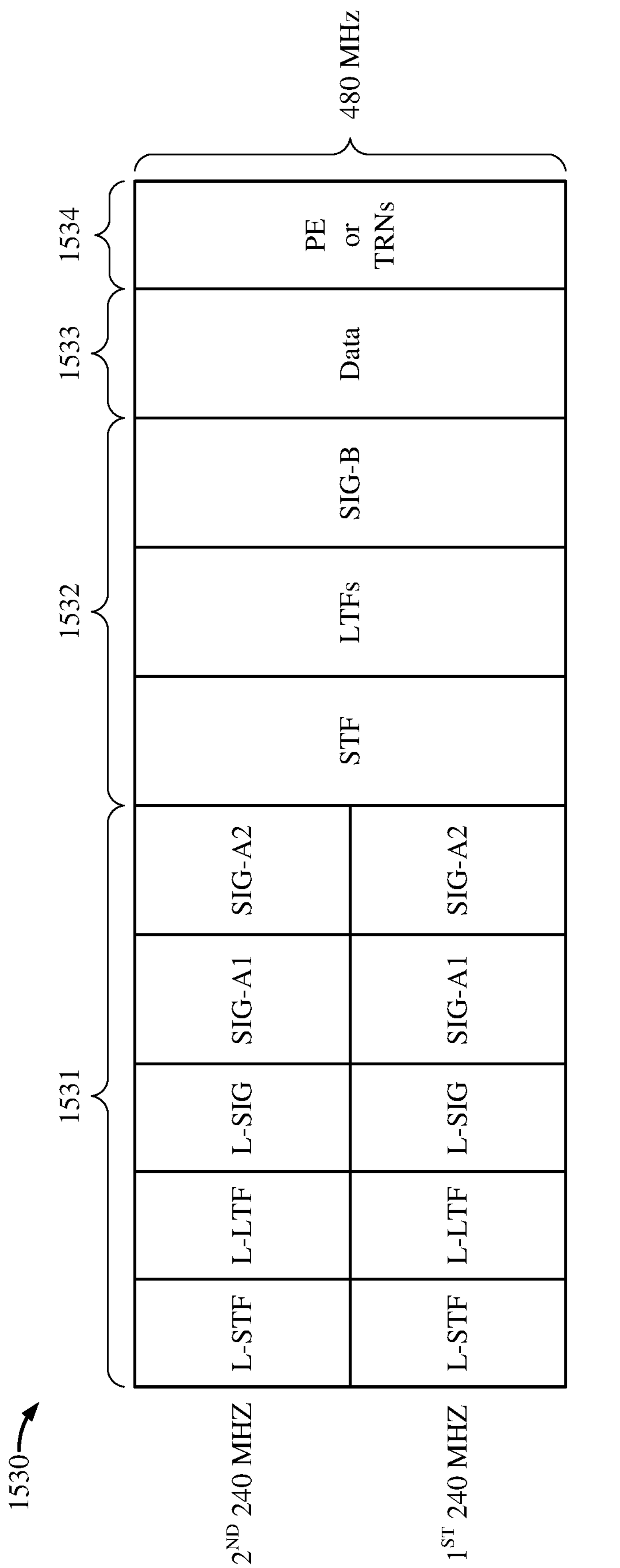
FIG. 15D shows another example up-clocked PPDU based on the PPDU format depicted in FIG. 15A, according to some implementations.

FIG. 15D shows another example up-clocked PPDU 1530 based on the PPDU format depicted in FIG. 15A, according to some implementations. The PPDU 1530 includes a PHY preamble, having a first portion 1531 and a second portion 1532, followed by a data portion 1533. In some implementations, a PE or TRN field 1534 may be added to the PPDU 1531 to support enhanced features for wireless communications on carrier frequencies above 7 GHz. In some aspects, the PPDU 1530 may represent an up-clocking of the PPDU 1500 by a factor of 12. As such, the first preamble portion 1531, the second preamble portion 1532, and the data portion 1533 may be examples of the first preamble portion 1501, the second preamble portion 1502, and the data portion 1503, respectively, of FIG. 15A. In some aspects, the up-clocking may be performed by the OFDM up-clocking system 1400 of FIG. 14. As a result of up-clocking the PPDU 1500 by a factor of 12, the data portion 1533 is spread over a 480 MHz bandwidth and the first preamble portion 1531 is duplicated on two 240 MHz sub-bands spanning the 480 MHz bandwidth.

Figure 16:
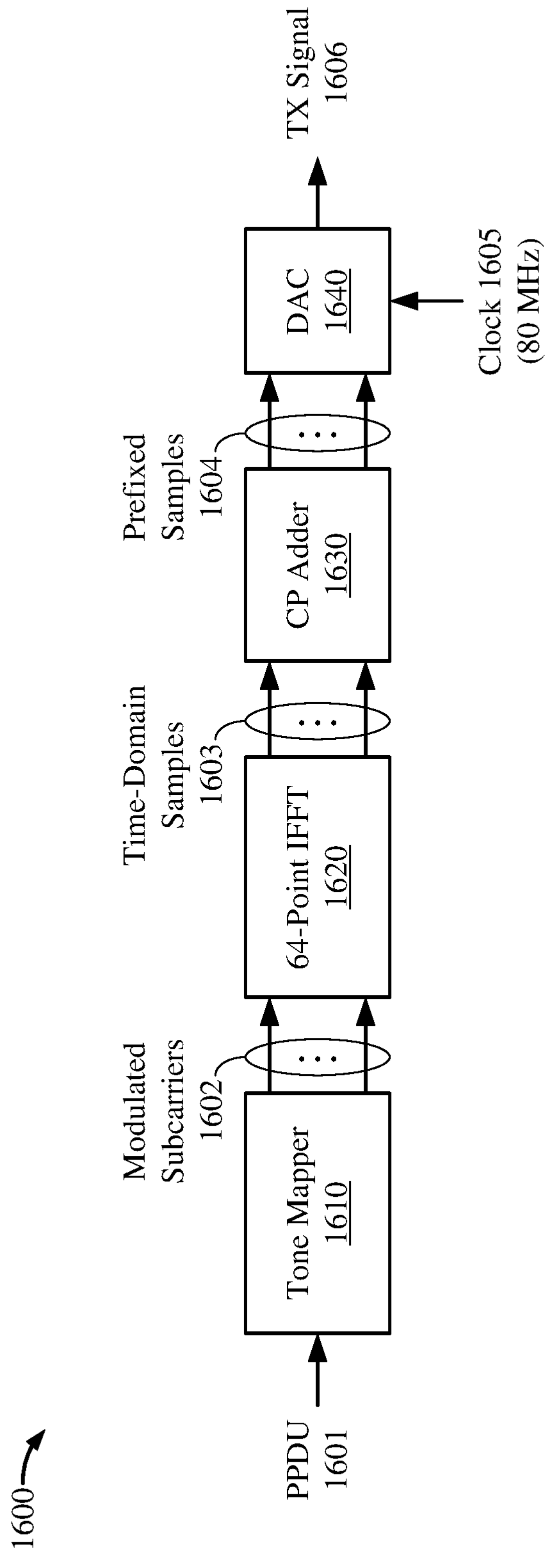
FIG. 16 shows another block diagram of an example OFDM up-clocking system, according to some implementations.

FIG. 16 shows another block diagram of an example OFDM up-clocking system 1600, according to some implementations. In some aspects, the OFDM up-clocking system 1600 may be configured to up-clock a PPDU 1601 to a TX signal 1606 suitable for transmission on carrier frequencies above 7 GHz (such as in the 60 GHz or 45 GHz frequency bands). More specifically, the OFDM up-clocking system 1600 may map the PPDU 1601 onto a set of orthogonal subcarriers associated with a 1×SCS greater than or equal to 1.2 MHz. In some implementations, the OFDM up-clocking system 1600 may be one example of the OFDM modulator 620 of FIG. 6. With reference for example to FIG. 6, the PPDU 1601 and the TX signal 1606 may be examples of the FD symbols 602 and the TX signal 603, respectively.

The OFDM up-clocking system 1600 includes a tone mapper 1610, a 64-point IFFT 1620, a CP adder 1630, and a DAC 1640. In the example of FIG. 16, the tone mapper 1610 is configured to map the PPDU 1601 to 64 subcarriers associated with a given bandwidth to produce 64 modulated subcarriers 1602. In some implementations, the PPDU 1601 may conform to an 11ac PPDU format associated with a 20 MHz channel bandwidth. In such implementations, the 64 subcarriers may include 52 data subcarriers, 4 pilot subcarriers, 7 guard subcarriers, and 1 DC subcarrier. The 64-point IFFT 1620 transforms the 64 modulated subcarriers 1602, from the frequency domain to the time domain, as 64 time-domain samples 1603. The CP adder 1630 adds a cyclic prefix to the time-domain samples 1603 to produce a number of prefixed samples 1604.

The DAC 1640 converts the prefixed samples 1604 to the TX signal 1606 based on a clock signal 1605. As described with reference to FIG. 7, the SCS associated with the TX signal 1606 depends on the sampling rate $f_s$ of the DAC 1640 (which is controlled by the frequency of the clock signal 1605) and the size $N_{IFFT}$ of the IFFT 1620, where $$SCS = \frac{f_s}{N_{IFFT}}.$$

In some aspects, the clock signal 1605 may be up-clocked to a frequency higher than 20 MHz. More specifically, the frequency of the clock signal 1605 may be configured to ensure that the 1×SCS associated with the TX signal 1606 is greater than or equal to 1.2 MHz. In some implementations, the clock signal 1605 may be up-clocked to 80 MHz, which results in a 1×SCS equal to 1.25 MHz. Table 9 summarizes example parameters for up-clocking a PPDU 1601 conforming to an 11ac PPDU format associated with a 20 MHz channel bandwidth.

TABLE 9

| | Baseline 11ac PPDU Format for 20 MHz Channel Bandwidth | | | |
|---|---|---|---|---|
| Bandwidth | 80 MHz | 160 MHz | 320 MHz | 480 MHz |
| Up-clocking | 4x | 8x | 16x | 24x |
| IFFT Size | 64 | 64 | 64 | 64 |
| # Data Subcarriers | 52 | 52 | 52 | 52 |
| # Pilot Subcarriers | 4 | 4 | 4 | 4 |
| # Guard/DC Subcarriers | 7/1 | 7/1 | 7/1 | 7/1 |
| Subcarrier Spacing | 1.25 MHz | 2.5 MHz | 5 MHz | 7.5 MHz |
| Symbol Duration | 800 ns | 400 ns | 200 ns | 133.33 ns |
| Cyclic Prefix Duration | 200 ns (long) 100 ns (short) | 100 ns (long) 50 ns (short) | 50 ns (long) 25 ns (short) | 33.33 ns (long) 16.67 ns (short) |
| Data Rate with 16QAM ¾ | 173 Mbps | 347 Mbps | 693 Mbps | 1.387 Gbps |

Figure 17A:
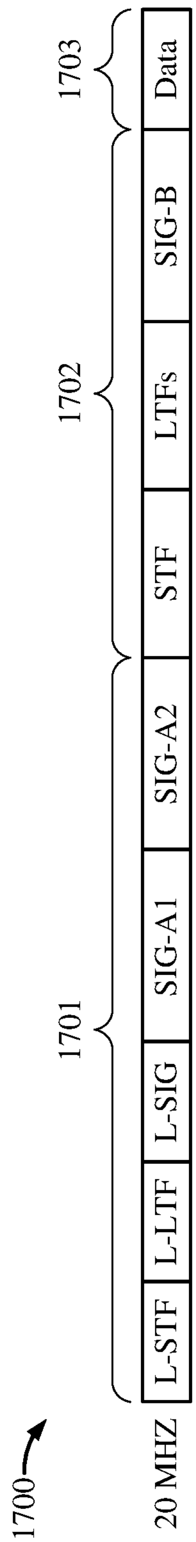
FIG. 17A shows an example PPDU formatted in accordance with a legacy PPDU format.

FIG. 17A shows an example PPDU 1700 formatted in accordance with a legacy PPDU format. In the example of FIG. 17A, the legacy PPDU format is an 11ac PPDU format associated with a 20 MHz channel bandwidth. The PPDU 1700 includes a PHY preamble, having a first portion 1701 and a second portion 1702, followed by a data portion 1703. The first preamble portion 1701 includes an L-STF, an L-LTF, an L-SIG, a first non-legacy signal field (SIG-A) spanning a first symbol (SIG-A1) and a second symbol (SIG-A2). The second preamble portion 1702 includes a non-legacy short training field (STF), one or more non-legacy long training fields (LTFs), and a second non-legacy signal field (SIG-B).

The IEEE 802.11ac amendment of the IEEE 802.11 standard defines the non-legacy fields SIG-A1, SIG-A2, STF, LTFs, and SIG-B as VHT fields VHT-SIG-A1, VHT-SIG-A2, VHT-STF, VHT-LTFs, and VHT-SIG-B, respectively. In some implementations, one or more of the non-legacy fields may be repurposed to carry signaling or other information specific to wireless communications on carrier frequencies above 7 GHz (such as in the 60 GHz or 45 GHz frequency bands). According to the 11ac PPDU format, the first preamble portion 1701, the second preamble portion 1702, and the data portion 1702 are mapped to the same subcarriers.

Figure 17B:
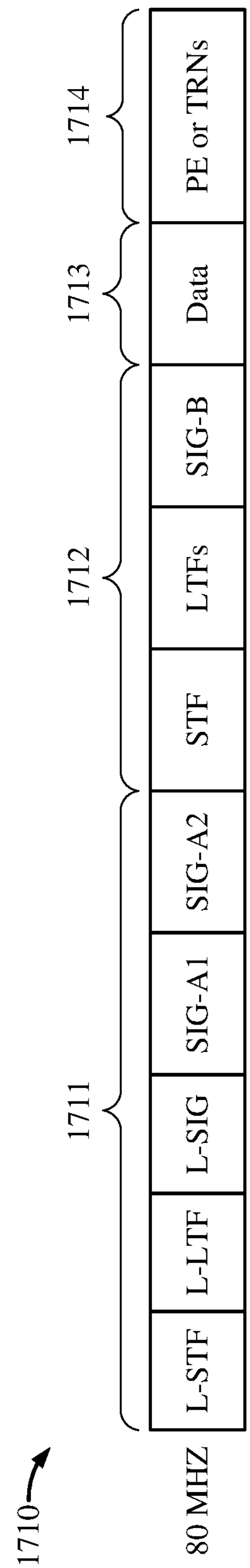
FIG. 17B shows an example up-clocked PPDU based on the PPDU format depicted in FIG. 17A, according to some implementations.

FIG. 17B shows an example up-clocked PPDU 1710 based on the PPDU format depicted in FIG. 17A, according to some implementations. The PPDU 1710 includes a PHY preamble, having a first portion 1711 and a second portion 1712, followed by a data portion 1713. In some implementations, a PE or TRN field 1714 may be added to the PPDU 1711 to support enhanced features for wireless communications on carrier frequencies above 7 GHz. In some aspects, the PPDU 1710 may represent an up-clocking of the PPDU 1700 by a factor of 4. As such, the first preamble portion 1711, the second preamble portion 1712, and the data portion 1713 may be examples of the first preamble portion 1701, the second preamble portion 1702, and the data portion 1703, respectively, of FIG. 17A. In some aspects, the up-clocking may be performed by the OFDM up-clocking system 1600 of FIG. 16. As a result of up-clocking the PPDU 1700 by a factor of 4, the PPDU 1710 is spread over an 80 MHz bandwidth.

Figure 18:
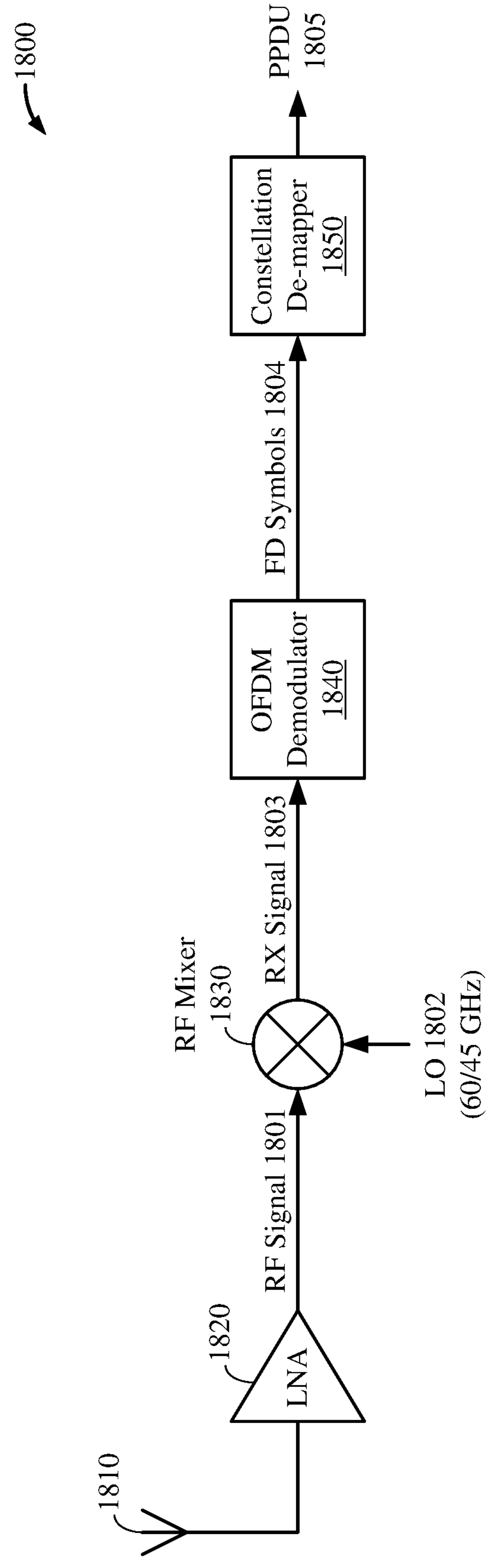
FIG. 18 shows a block diagram of an example receive (RX) processing chain for a wireless communication device, according to some implementations.

FIG. 18 shows a block diagram of an example RX processing chain 1800 for a wireless communication device, according to some implementations. In some aspects, the wireless communication device may be one example of the wireless communication device 400 of FIG. 4. The RX processing chain 1800 is configured to recover a PPDU 1805 from an RF signal 1801 received over a wireless channel. In some implementations, the PPDU 1805 may be one example of any of the PPDUs 300 or 601 of FIGS. 3 and 6, respectively. For simplicity, only a single spatial stream of the RX processing chain 1800 is depicted in FIG. 18. In actual implementations, the RX processing chain 1800 may include any number of spatial streams.

The RX processing chain 1800 includes a low-noise amplifier (LNA) 1820, an RF mixer 1830, an OFDM demodulator 1840, and a constellation de-mapper 1850. The LNA 1820 amplifies the RF signal 1801 received via one or more antennas 1810, and the RF mixer 1830 down-converts the RF signal 1801 to a baseband RX signal 1803. For example, the RF mixer 1830 may demodulate the RF signal 1801 based on an LO signal 1802 that oscillates at a carrier frequency. In the example of FIG. 18, the carrier frequency associated with the LO signal 1802 is shown to be higher than 7 GHz. In some implementations, the carrier frequency may be in the 60 GHz frequency band. In some other implementations, the carrier frequency may be in the 45 GHz frequency band. The OFDM demodulator 1840 demodulates the RX signal 1803 as one or more frequency-domain (FD) symbols 1804 associated with a modulation scheme. In some implementations, the OFDM demodulator 1840 may reverse the modulation performed by the OFDM modulator 620 of FIG. 6. The constellation de-mapper 1850 de-maps the FD symbols 1804 to recover the PPDU 1805. In some implementations, the constellation de-mapper 1850 may reverse the mapping performed by the constellation mapper 610 of FIG. 6.

Figure 19:
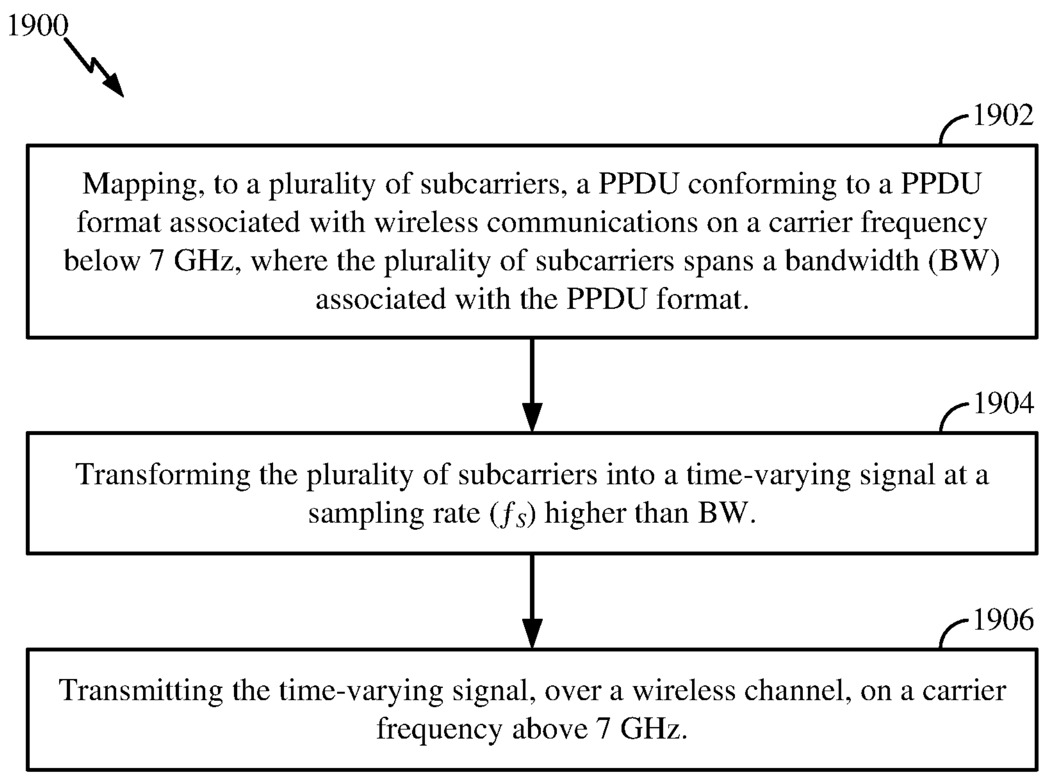
FIG. 19 shows a flowchart illustrating an example process for wireless communication that supports 60 GHz numerology for wireless local area networks (WLANs).

FIG. 19 shows a flowchart illustrating an example process 1900 for wireless communication that supports 60 GHz numerology for WLANs. In some implementations, the process 1900 may be performed by a wireless communication device operating as or within an AP, such as any one of the APs 102 or 502 described above with reference to FIGS. 1 and 5A, respectively. In some other implementations, the process 1900 may be performed by a wireless communication device operating as or within a STA, such as any one of the STAs 104 or 504 described above with reference to FIGS. 1 and 5B, respectively.

In some implementations, the process 1900 begins in block 1902 with mapping, to a plurality of subcarriers, a PPDU conforming to a PPDU format associated with wireless communications on a carrier frequency below 7 GHz, where the plurality of subcarriers spans a bandwidth (BW) associated with the PPDU format. In block 1904, the process 1900 proceeds with transforming the plurality of subcarriers into a time-varying signal at a sampling rate ($f_s$) higher than BW. In block 1906, the process 1900 proceeds with transmitting the time-varying signal, over a wireless channel, on a carrier frequency above 7 GHz. In some implementations, $f_s$=4*BW. In some other implementations, $f_s$=8*BW. In some other implementations, $f_s$=16*BW. Still further, in some implementations, $f_s$=32*BW.

In some aspects, the PPDU may include a PHY preamble followed by a data portion and the sampling rate $f_s$ may be associated with a subcarrier spacing (SCS) greater than 1.2 MHz, where the SCS represents an amount of separation, in the frequency domain, between adjacent subcarriers of the plurality of subcarriers to which the PHY preamble is mapped. In some implementations, the SCS may be equal to 10 MHz. In some other implementations, the SCS may be equal to 7.5 MHz. In such implementations, the plurality of subcarriers includes 108 data subcarriers, 6 pilot subcarriers, 11 guard subcarriers, and 3 DC subcarriers, the plurality of subcarriers is transformed into the time-varying signal based on a 128-point IFFT, and $f_s$=960 MHz.

In some aspects, the SCS may be equal to 1.25 MHz. In some implementations, the plurality of subcarriers may include 234 data subcarriers, 8 pilot subcarriers, 11 guard subcarriers, and 3 direct current (DC) subcarriers, the plurality of subcarriers may be transformed into the time-varying signal based on a 256-point IFFT, and $f_s$=320 MHz. In some other implementations, the plurality of subcarriers may include 468 data subcarriers, 16 pilot subcarriers, 11 guard subcarriers, and 11 DC subcarriers, the plurality of subcarriers may be transformed into the time-varying signal based on two 256-point IFFTs, and $f_s$=640 MHz.

In some aspects, the SCS may be equal to 1.875 MHz. In some implementations, the plurality of subcarriers may include 234 data subcarriers, 8 pilot subcarriers, 11 guard subcarriers, and 3 DC subcarriers, the plurality of subcarriers may be transformed into the time-varying signal based on a 256-point IFFT, and $f_s$=480 MHz. In some other implementations, the plurality of subcarriers includes 468 data subcarriers, 16 pilot subcarriers, 11 guard subcarriers, and 11 DC subcarriers, the plurality of subcarriers may be transformed into the time-varying signal based on two 256-point IFFTs, and $f_s$=960 MHz.

In some aspects, the SCS may be equal to 2.5 MHz. In some implementations, the plurality of subcarriers may include 108 data subcarriers, 6 pilot subcarriers, 11 guard subcarriers, and 3 DC subcarriers, the plurality of subcarriers may be transformed into the time-varying signal based on a 128-point IFFT, and $f_s$=320 MHz. In some other implementations, the plurality of subcarriers may include 468 data subcarriers, 16 pilot subcarriers, 11 guard subcarriers, and 11 DC subcarriers, the plurality of subcarriers may be transformed into the time-varying signal based on a 512-point IFFT, and $f_s$=1.28 GHz. Still further, in some implementations, the plurality of subcarriers may include 468 data subcarriers, 16 pilot subcarriers, 23 guard subcarriers, and 5 DC subcarriers, the plurality of subcarriers may be transformed into the time-varying signal based on a 512-point IFFT, and $f_s$=1.28 GHz.

In some aspects, the SCS may be equal to 3.75 MHz. In some implementations, the plurality of subcarriers may include 108 data subcarriers, 6 pilot subcarriers, 11 guard subcarriers, and 3 DC subcarriers, the plurality of subcarriers may be transformed into the time-varying signal based on a 128-point IFFT, and $f_s$=480 MHz. In some other implementations, the plurality of subcarriers may include 468 data subcarriers, 16 pilot subcarriers, 11 guard subcarriers, and 11 DC subcarriers, the plurality of subcarriers may be transformed into the time-varying signal based on a 512-point IFFT, and $f_s$=1.92 GHz. Still further, in some implementations, the plurality of subcarriers may include 468 data subcarriers, 16 pilot subcarriers, 23 guard subcarriers, and 5 DC subcarriers, the plurality of subcarriers may be transformed into the time-varying signal based on a 512-point IFFT, and $f_s$=1.92 GHz.

In some aspects, the SCS may be equal to 5 MHz. In some implementations, the plurality of subcarriers may include 108 data subcarriers, 6 pilot subcarriers, 11 guard subcarriers, and 3 DC subcarriers, the plurality of subcarriers may be transformed into the time-varying signal based on a 128-point IFFT, and $f_s$=640 MHz. In some other implementations, the plurality of subcarriers may include 468 data subcarriers, 16 pilot subcarriers, 11 guard subcarriers, and 11 DC subcarriers, the plurality of subcarriers may be transformed into the time-varying signal based on a 512-point IFFT, and $f_s$=2.56 GHz. Still further, in some implementations, the plurality of subcarriers may include 468 data subcarriers, 16 pilot subcarriers, 23 guard subcarriers, and 5 DC subcarriers, the plurality of subcarriers may be transformed into the time-varying signal based on a 512-point IFFT, and $f_s$=2.56 GHz.

Figure 20:
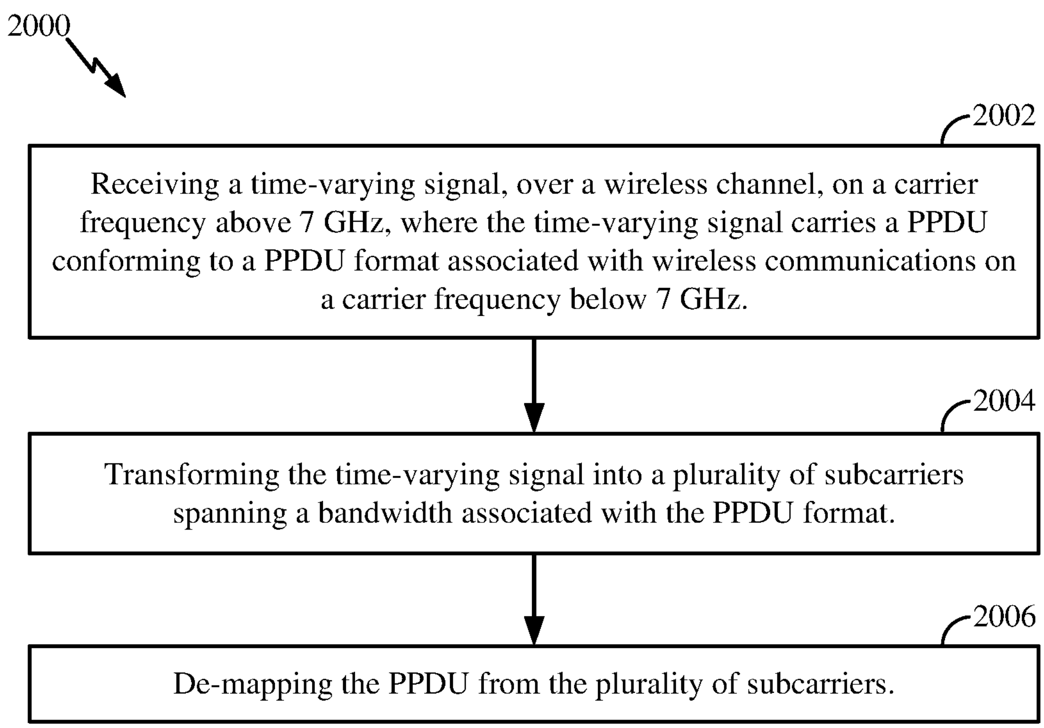
FIG. 20 shows a flowchart illustrating an example process for wireless communication that supports 60 GHz numerology for WLANs.

FIG. 20 shows a flowchart illustrating an example process 2000 for wireless communication that supports 60 GHz numerology for WLANs. In some implementations, the process 2000 may be performed by a wireless communication device operating as or within an AP, such as any one of the APs 102 or 502 described above with reference to FIGS. 1 and 5A, respectively. In some other implementations, the process 2000 may be performed by a wireless communication device operating as or within a STA, such as any one of the STAs 104 or 504 described above with reference to FIGS. 1 and 5B, respectively.

In some implementations, the process 2000 begins in block 2002 with receiving a time-varying signal, over a wireless channel, on a carrier frequency above 7 GHz, where the time-varying signal carries a PPDU conforming to a PPDU format associated with wireless communications on a carrier frequency below 7 GHz. In block 2004, the process 2000 proceeds with transforming the time-varying signal into a plurality of subcarriers spanning a bandwidth associated with the PPDU format. In block 2006, the process 2000 proceeds with de-mapping the PPDU from the plurality of subcarriers.

Figure 21:
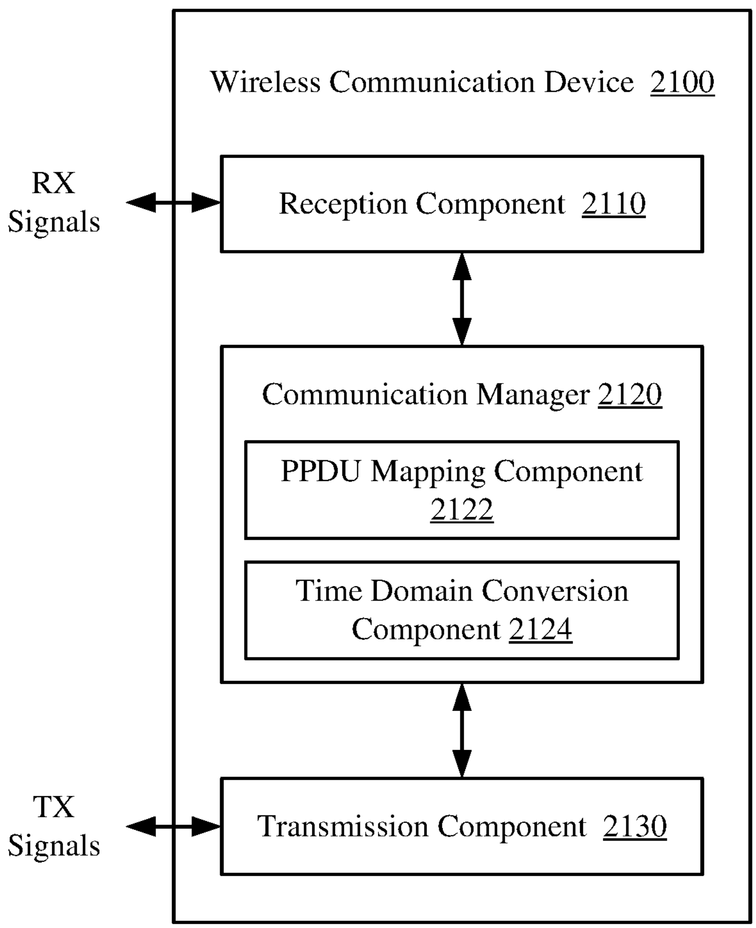
FIG. 21 shows a block diagram of an example wireless communication device according to some implementations.

FIG. 21 shows a block diagram of an example wireless communication device 2100 according to some implementations. In some implementations, the wireless communication device 2100 is configured to perform the process 1900 described above with reference to FIG. 19. The wireless communication device 2100 can be an example implementation of the wireless communication device 400 described above with reference to FIG. 4. For example, the wireless communication device 2100 can be a chip, SoC, chipset, package or device that includes at least one processor and at least one modem (for example, a Wi-Fi (IEEE 802.11) modem or a cellular modem).

The wireless communication device 2100 includes a reception component 2110, a communication manager 2120, and a transmission component 2130. The communication manager 2120 further includes a PPDU mapping component 2122 and a time domain conversion component 2124. Portions of one or more of the components 2122 and 2124 may be implemented at least in part in hardware or firmware. In some implementations, at least some of the components 2122 or 2124 are implemented at least in part as software stored in a memory (such as the memory 408). For example, portions of one or more of the components 2122 and 2124 can be implemented as non-transitory instructions (or "code") executable by a processor (such as the processor 406) to perform the functions or operations of the respective component.

The reception component 2110 is configured to receive RX signals, over a wireless channel, from one or more other wireless communication devices. The communication manager 2120 is configured to control or manage communications with one or more other wireless communication devices. In some implementations, the PPDU mapping component 2122 may map, to a plurality of subcarriers, a PPDU conforming to a PPDU format associated with wireless communications on a carrier frequency below 7 GHz, where the plurality of subcarriers spans a bandwidth (BW) associated with the PPDU format; and the time domain conversion component 2124 may transform the plurality of subcarriers into a time-varying signal at a sampling rate higher than BW. The transmission component 2130 is configured to transmit TX signals, over a wireless channel, to one or more other wireless communication devices. In some implementations, the transmission component 1930 may transmit the time-varying signal, over a wireless channel, on a carrier frequency above 7 GHz.

Figure 22:
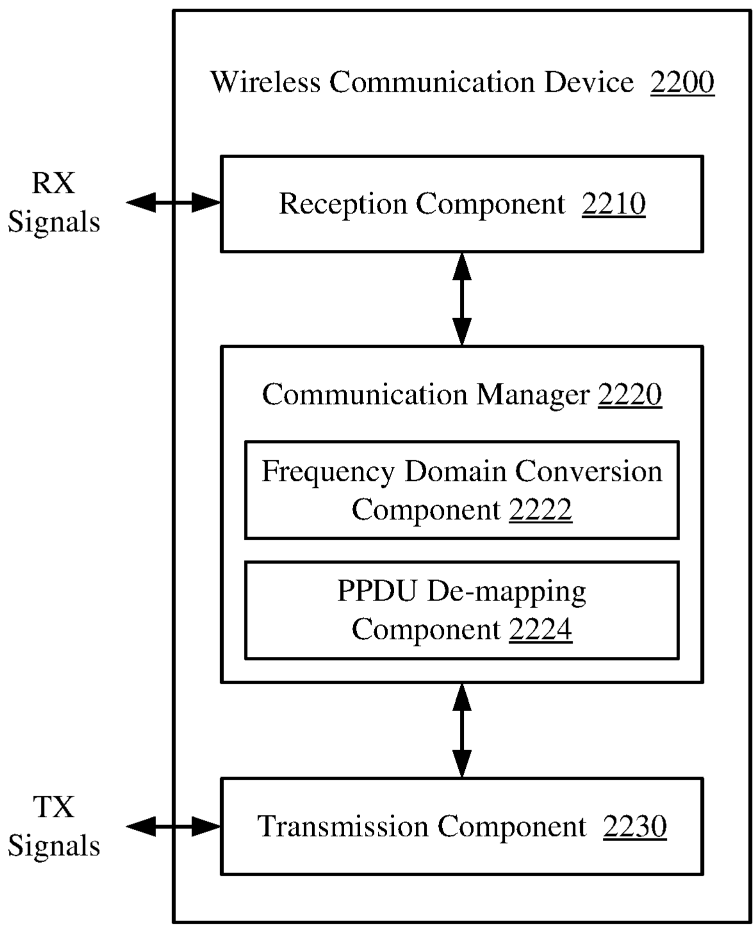
FIG. 22 shows a block diagram of an example wireless communication device according to some implementations.

FIG. 22 shows a block diagram of an example wireless communication device 2200 according to some implementations. In some implementations, the wireless communication device 2200 is configured to perform the process 2000 described above with reference to FIG. 20. The wireless communication device 2200 can be an example implementation of the wireless communication device 400 described above with reference to FIG. 4. For example, the wireless communication device 2200 can be a chip, SoC, chipset, package or device that includes at least one processor and at least one modem (for example, a Wi-Fi (IEEE 802.11) modem or a cellular modem).

The wireless communication device 2200 includes a reception component 2210, a communication manager 2220, and a transmission component 2230. The communication manager 2220 further includes a frequency domain conversion component 2222 and a PPDU de-mapping component 2224. Portions of one or more of the components 2222 and 2224 may be implemented at least in part in hardware or firmware. In some implementations, at least some of the components 2222 or 2224 are implemented at least in part as software stored in a memory (such as the memory 408). For example, portions of one or more of the components 2222 and 2224 can be implemented as non-transitory instructions (or "code") executable by a processor (such as the processor 406) to perform the functions or operations of the respective component.

The reception component 2210 is configured to receive RX signals, over a wireless channel, from one or more other wireless communication devices. In some implementations, the reception component 2210 may receive a time-varying signal, over a wireless channel, on a carrier frequency above 7 GHz, where the time-varying signal carries a PPDU conforming to a PPDU format associated with wireless communications on a carrier frequency below 7 GHz. The communication manager 2220 is configured to control or manage communications with one or more other wireless communication devices. In some implementations, the frequency domain conversion component 2222 may transform the time-varying signal into a plurality of subcarriers spanning a bandwidth associated with the PPDU format; and the PPDU de-mapping component 2224 may de-map the PPDU from the plurality of subcarriers. The transmission component 2230 is configured to transmit TX signals, over a wireless channel, to one or more other wireless communication devices.

Implementation examples are described in the following numbered clauses:

1. A method for wireless communication by a wireless communication device, including:

mapping, to a plurality of subcarriers, a physical layer (PHY) convergence protocol (PLCP) protocol data unit (PPDU) conforming to a PPDU format associated with wireless communications on a carrier frequency below 7 GHz, the plurality of subcarriers spanning a bandwidth (BW) associated with the PPDU format;

transforming the plurality of subcarriers into a time-varying signal at a sampling rate ($f_s$) higher than BW; and transmitting the time-varying signal, over a wireless channel, on a carrier frequency above 7 GHz.

2. The method of clause 1, where $f_s$=4*BW.
3. The method of clause 1, where $f_s$=8*BW.
4. The method of clause 1, where $f_s$=16*BW.
5. The method of clause 1, where $f_s$=32*BW
6. The method of any of clauses 1-5, where the PPDU includes a PHY preamble followed by a data portion and the sampling rate $f_s$ is associated with a subcarrier spacing (SCS) greater than 1.2 MHz, the SCS representing an amount of separation, in the frequency domain, between adjacent subcarriers of the plurality of subcarriers to which the PHY preamble is mapped.
7. The method of any of clauses 1-6, where the SCS is equal to 1.25 MHz.
8. The method of any of clauses 1-7, where the plurality of subcarriers includes 234 data subcarriers, 8 pilot subcarriers, 11 guard subcarriers, and 3 direct current (DC) subcarriers, the plurality of subcarriers is transformed into the time-varying signal based on a 256-point IFFT, and $f_s$=320 MHz.
9. The method of any of clauses 1-7, where the plurality of subcarriers includes 468 data subcarriers, 16 pilot subcarriers, 11 guard subcarriers, and 11 DC subcarriers, the plurality of subcarriers is transformed into the time-varying signal based on two 256-point IFFTs, and $f_s$=640 MHz.
10. The method of any of clauses 1-6, where the SCS is equal to 1.875 MHz.
11. The method of any of clauses 1-6 or 10, where the plurality of subcarriers includes 234 data subcarriers, 8 pilot subcarriers, 11 guard subcarriers, and 3 DC subcarriers, the plurality of subcarriers is transformed into the time-varying signal based on a 256-point IFFT, and $f_s$=480 MHz.
12. The method of any of clauses 1-6 or 10, where the plurality of subcarriers includes 468 data subcarriers, 16 pilot subcarriers, 11 guard subcarriers, and 11 DC subcarriers, the plurality of subcarriers is transformed into the time-varying signal based on two 256-point IFFTs, and $f_s$=960 MHz.
13. The method of any of clauses 1-6, where the SCS is equal to 2.5 MHz.
14. The method of any of clauses 1-6 or 13, where the plurality of subcarriers includes 108 data subcarriers, 6 pilot subcarriers, 11 guard subcarriers, and 3 DC subcarriers, the plurality of subcarriers is transformed into the time-varying signal based on a 128-point IFFT, and $f_s$=320 MHz.
15. The method of any of clauses 1-6 or 13, where the plurality of subcarriers includes 468 data subcarriers, 16 pilot subcarriers, 11 guard subcarriers, and 11 DC subcarriers, the plurality of subcarriers is transformed into the time-varying signal based on a 512-point IFFT, and $f_s$=1.28 GHz.
16. The method of any of clauses 1-6 or 13, where the plurality of subcarriers includes 468 data subcarriers, 16 pilot subcarriers, 23 guard subcarriers, and 5 DC subcarriers, the plurality of subcarriers is transformed into the time-varying signal based on a 512-point IFFT, and $f_s$=1.28 GHz.
17. The method of any of clauses 1-6, where the SCS is equal to 3.75 MHz.
18. The method of any of clauses 1-6 or 17, where the plurality of subcarriers includes 108 data subcarriers, 6 pilot subcarriers, 11 guard subcarriers, and 3 DC subcarriers, the plurality of subcarriers is transformed into the time-varying signal based on a 128-point IFFT, and $f_s$=480 MHz.
19. The method of any of clauses 1-6 or 17, where the plurality of subcarriers includes 468 data subcarriers, 16 pilot subcarriers, 11 guard subcarriers, and 11 DC subcarriers, the plurality of subcarriers is transformed into the time-varying signal based on a 512-point IFFT, and $f_s$=1.92 GHz.
20. The method of any of clauses 1-6 or 17, where the plurality of subcarriers includes 468 data subcarriers, 16 pilot subcarriers, 23 guard subcarriers, and 5 DC subcarriers, the plurality of subcarriers is transformed into the time-varying signal based on a 512-point IFFT, and $f_s$=1.92 GHz.
21. The method of any of clauses 1-6, where the SCS is equal to 5 MHz.
22. The method of any of clauses 1-6 or 21, where the plurality of subcarriers includes 108 data subcarriers, 6 pilot subcarriers, 11 guard subcarriers, and 3 DC subcarriers, the plurality of subcarriers is transformed into the time-varying signal based on a 128-point IFFT, and $f_s$=640 MHz.
23. The method of any of clauses 1-6 or 21, where the plurality of subcarriers includes 468 data subcarriers, 16 pilot subcarriers, 11 guard subcarriers, and 11 DC subcarriers, the plurality of subcarriers is transformed into the time-varying signal based on a 512-point IFFT, and $f_s$=2.56 GHz.
24. The method of any of clauses 1-6 or 21, where the plurality of subcarriers includes 468 data subcarriers, 16 pilot subcarriers, 23 guard subcarriers, and 5 DC subcarriers, the plurality of subcarriers is transformed into the time-varying signal based on a 512-point IFFT, and $f_s$=2.56 GHz.
25. The method of any of clauses 1-6, where the SCS is equal to 7.5 MHz.
26. The method of any of clauses 1-6 or 25, where the plurality of subcarriers includes 108 data subcarriers, 6 pilot subcarriers, 11 guard subcarriers, and 3 DC subcarriers, the plurality of subcarriers is transformed into the time-varying signal based on a 128-point IFFT, and $f_s$=960 MHz.
27. The method of any of clauses 1-6, where the SCS is equal to 10 MHz.

28. A wireless communication device including:
at least one memory; and
at least one processor communicatively coupled with the at least one memory, the at least one processor configured to cause the wireless communication device to perform the method of any one or more of clauses 1-27.
29. A method for wireless communication by a wireless communication device, including:
receiving a time-varying signal, over a wireless channel, on a carrier frequency above 7 GHz, the time-varying signal carrying a physical layer convergence protocol (PLCP) protocol data unit (PPDU) conforming to a PPDU format associated with wireless communications on a carrier frequency below 7 GHz;
transforming the time-varying signal into a plurality of subcarriers spanning a bandwidth associated with the PPDU format; and
de-mapping the PPDU from the plurality of subcarriers.
30. A wireless communication device including:
at least one memory; and
at least one processor communicatively coupled with the at least one memory, the at least one processor configured to cause the wireless communication device to perform the method of clause 29.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
mapping, to a plurality of subcarriers, a physical layer (PHY) convergence protocol (PLCP) protocol data unit (PPDU) conforming to a PPDU format associated with wireless communications on a carrier frequency below 7 GHz, the plurality of subcarriers spanning a bandwidth (BW) associated with the PPDU format;
transforming the plurality of subcarriers into a time-varying signal at a sampling rate ($f_s$) higher than BW; and
transmitting the time-varying signal, over a wireless channel, on a carrier frequency above 7 GHz.

2. The method of claim 1, wherein $f_s$=4*BW.

3. The method of claim 1, wherein $f_s$=8*BW.

4. The method of claim 1, wherein $f_s$=16*BW.

5. The method of claim 1, wherein $f_s$=32*BW.

6. The method of claim 1, wherein the PPDU includes a PHY preamble followed by a data portion and the sampling rate $f_s$ is associated with a subcarrier spacing (SCS) greater than 1.2 MHz, the SCS representing an amount of separation, in the frequency domain, between adjacent subcarriers of the plurality of subcarriers to which the PHY preamble is mapped.

7. The method of claim 6, wherein the SCS is equal to 1.25 MHz.

8. The method of claim 7, wherein the plurality of subcarriers includes 234 data subcarriers, 8 pilot subcarriers, 11 guard subcarriers, and 3 direct current (DC) subcarriers, the plurality of subcarriers is transformed into the time-varying signal based on a 256-point IFFT, and $f_s$=320 MHz.

9. The method of claim 7, wherein the plurality of subcarriers includes 468 data subcarriers, 16 pilot subcarriers, 11 guard subcarriers, and 11 DC subcarriers, the plurality of subcarriers is transformed into the time-varying signal based on two 256-point IFFTs, and $f_s$=640 MHz.

10. The method of claim 6, wherein the SCS is equal to 1.875 MHz.

11. The method of claim 10, wherein the plurality of subcarriers includes 234 data subcarriers, 8 pilot subcarriers, 11 guard subcarriers, and 3 DC subcarriers, the plurality of subcarriers is transformed into the time-varying signal based on a 256-point IFFT, and $f_s$=480 MHz.

12. The method of claim 10, wherein the plurality of subcarriers includes 468 data subcarriers, 16 pilot subcarriers, 11 guard subcarriers, and 11 DC subcarriers, the plurality of subcarriers is transformed into the time-varying signal based on two 256-point IFFTs, and $f_s$=960 MHz.

13. The method of claim 6, wherein the SCS is equal to 2.5 MHz.

14. The method of claim 13, wherein the plurality of subcarriers includes 108 data subcarriers, 6 pilot subcarriers, 11 guard subcarriers, and 3 DC subcarriers, the plurality of subcarriers is transformed into the time-varying signal based on a 128-point IFFT, and $f_s$=320 MHz.

15. The method of claim 13, wherein the plurality of subcarriers includes 468 data subcarriers, 16 pilot subcarriers, 11 guard subcarriers, and 11 DC subcarriers, the plurality of subcarriers is transformed into the time-varying signal based on a 512-point IFFT, and $f_s$=1.28 GHz.

16. The method of claim 13, wherein the plurality of subcarriers includes 468 data subcarriers, 16 pilot subcarriers, 23 guard subcarriers, and 5 DC subcarriers, the plurality of subcarriers is transformed into the time-varying signal based on a 512-point IFFT, and $f_s$=1.28 GHz.

17. The method of claim 6, wherein the SCS is equal to 3.75 MHz.

18. The method of claim 17, wherein the plurality of subcarriers includes 108 data subcarriers, 6 pilot subcarriers, 11 guard subcarriers, and 3 DC subcarriers, the plurality of subcarriers is transformed into the time-varying signal based on a 128-point IFFT, and $f_s$=480 MHz.

19. The method of claim 17, wherein the plurality of subcarriers includes 468 data subcarriers, 16 pilot subcarriers, 11 guard subcarriers, and 11 DC subcarriers, the plurality of subcarriers is transformed into the time-varying signal based on a 512-point IFFT, and $f_s$=1.92 GHz.

20. The method of claim 17, wherein the plurality of subcarriers includes 468 data subcarriers, 16 pilot subcarriers, 23 guard subcarriers, and 5 DC subcarriers, the plurality of subcarriers is transformed into the time-varying signal based on a 512-point IFFT, and $f_s$=1.92 GHz.

21. The method of claim 6, wherein the SCS is equal to 5 MHz.

22. The method of claim 21, wherein the plurality of subcarriers includes 108 data subcarriers, 6 pilot subcarriers, 11 guard subcarriers, and 3 DC subcarriers, the plurality of subcarriers is transformed into the time-varying signal based on a 128-point IFFT, and $f_s$=640 MHz.

23. The method of claim 21, wherein the plurality of subcarriers includes 468 data subcarriers, 16 pilot subcarriers, 11 guard subcarriers, and 11 DC subcarriers, the plurality of subcarriers is transformed into the time-varying signal based on a 512-point IFFT, and $f_s$=2.56 GHz.

24. The method of claim 21, wherein the plurality of subcarriers includes 468 data subcarriers, 16 pilot subcarriers, 23 guard subcarriers, and 5 DC subcarriers, the plurality of subcarriers is transformed into the time-varying signal based on a 512-point IFFT, and $f_s$=2.56 GHz.

25. The method of claim 6, wherein the SCS is equal to 7.5 MHz.

26. The method of claim 25, wherein the plurality of subcarriers includes 108 data subcarriers, 6 pilot subcarriers, 11 guard subcarriers, and 3 DC subcarriers, the plurality of subcarriers is transformed into the time-varying signal based on a 128-point IFFT, and $f_s$=960 MHz.

27. The method of claim 6, wherein the SCS is equal to 10 MHz.

28. A wireless communication device comprising:

at least one memory; and at least one processor communicatively coupled with the at least one memory, the at least one processor configured to cause the wireless communication device to:

map, to a plurality of subcarriers, a physical layer (PHY) convergence protocol (PLCP) protocol data unit (PPDU) conforming to a PPDU format associated with wireless communications on a carrier frequency below 7 GHz, the plurality of subcarriers spanning a bandwidth (BW) associated with the PPDU format;

transform the plurality of subcarriers into a time-varying signal at a sampling rate ($f_s$) higher than BW; and transmit the time-varying signal, over a wireless channel, on a carrier frequency above 7 GHz.

29. A method of wireless communication performed by a wireless communication device comprising:

receiving a time-varying signal, over a wireless channel, on a carrier frequency above 7 GHz, the time-varying signal carrying a physical layer convergence protocol (PLCP) protocol data unit (PPDU) conforming to a PPDU format associated with wireless communications on a carrier frequency below 7 GHz;

transforming the time-varying signal into a plurality of subcarriers spanning a bandwidth associated with the PPDU format; and de-mapping the PPDU from the plurality of subcarriers.

30. A wireless communication device comprising:

at least one memory; and at least one processor communicatively coupled with the at least one memory, the at least one processor configured to cause the wireless communication device to:

receive a time-varying signal, over a wireless channel, on a carrier frequency above 7 GHz, the time-varying signal carrying a physical layer convergence protocol (PLCP) protocol data unit (PPDU) conforming to a PPDU format associated with wireless communications on a carrier frequency below 7 GHz;

transforming the time-varying signal into a plurality of subcarriers spanning a bandwidth associated with the PPDU format; and de-mapping the PPDU from the plurality of subcarriers.

* * * * *